United States Patent
Kanto et al.

(10) Patent No.: US 9,042,642 B2
(45) Date of Patent: May 26, 2015

(54) IMAGE PROCESSING APPARATUS AND IMAGE PICKUP APPARATUS

(71) Applicant: FUJITSU LIMITED, Kawasaki-shi (JP)

(72) Inventors: Nobuyuki Kanto, Kobe (JP);
Masayoshi Shimizu, Hadano (JP);
Hiroyasu Yoshikawa, Akashi (JP);
Yukio Hirai, Akashi (JP); Takuya Kamimura, Kobe (JP)

(73) Assignee: FUJITSU LIMITED, Kawasaki (JP)

( * ) Notice: Subject to any disclaimer, the term of this patent is extended or adjusted under 35 U.S.C. 154(b) by 320 days.

(21) Appl. No.: 13/632,695

(22) Filed: Oct. 1, 2012

(65) Prior Publication Data

US 2013/0088613 A1    Apr. 11, 2013

(30) Foreign Application Priority Data

Oct. 7, 2011    (JP) .................. 2011-222882

(51) Int. Cl.
| | | |
|---|---|---|
| *G06K 9/00* | (2006.01) | |
| *H04N 1/60* | (2006.01) | |
| *H04N 9/04* | (2006.01) | |

(52) U.S. Cl.
CPC ............. *H04N 1/6027* (2013.01); *H04N 9/045* (2013.01)

(58) Field of Classification Search
None
See application file for complete search history.

(56) References Cited

U.S. PATENT DOCUMENTS

| | | |
|---|---|---|
| 5,805,313 A | 9/1998 | Hayashi et al. |
| 6,657,746 B1 | 12/2003 | Fuchigami et al. |
| 2002/0018225 A1* | 2/2002 | Okamoto .................. 358/1.9 |
| 2008/0100702 A1* | 5/2008 | Tannai ........................ 348/65 |
| 2010/0039507 A1* | 2/2010 | Imade ........................ 348/68 |
| 2011/0298953 A1* | 12/2011 | Nakamura .................. 348/241 |

FOREIGN PATENT DOCUMENTS

| | | |
|---|---|---|
| JP | 1-228268 A | 9/1989 |
| JP | 6-113126 A | 4/1994 |
| JP | 2000-188695 A | 7/2000 |
| JP | 2010-171950 A | 8/2010 |

OTHER PUBLICATIONS

Yoshitaka Toyoda et al., "Near Infrared Cameras to Capture Full Color Images," The Journal of the Institute of Image Information and Television Engineers, vol. 64, No. 1, pp. 101-110 (Jan. 2010).
Japanese Office Action mailed Mar. 24, 2015 for corresponding Japanese Patent Application No. 2011-222882, with Partial English Translation, 8 pages.

* cited by examiner

*Primary Examiner* — Stephen R Koziol
*Assistant Examiner* — Amandeep Saini
(74) *Attorney, Agent, or Firm* — Fujitsu Patent Center

(57) ABSTRACT

A determining unit determines which one of a plurality of divided areas in color distribution a value of an input image single falls within. The plurality of divided areas are defined for each of R, G, and B color components, and the determining unit determines, for each color component, which one of the plurality of divided areas the value of the input image signal falls within. An image correcting unit reads correction coefficients corresponding to the determined divided area for each color component from a correction coefficient storing unit in which correction coefficients are registered for each of the color components and each of the divided areas. The image correcting unit calculates each of R, G, and B output values of an output image signal using the correction coefficients of the individual color components read from the correction coefficient storing unit.

10 Claims, 19 Drawing Sheets ds : Dark Skin, ls : Light Skin, bs : Blue Sky, fo : Foliage, bf : Blue Flower,
bg : Bluish Green, or : Orange, pb : Purplish Blue, mr : Moderate Red,
pu : Purple, yg : Yellow Green, oy : Orange Yellow, bl : Blue, gr : Green,
re : Red, ye : Yellow, ma : Magenta, cy : Cyan, wh : White, n8 : Neutral 8,
n6.5 : Neutral 6.5, n5 : Neutral 5, n3.5 : Neutral 3.5, bk : Black

FIG. 15

200 DEMARCATION LINE TABLE

|  | DEMARCATION LINE 1 | DEMARCATION LINE 2 |
|---|---|---|
| R COMPONENT | y = A1*x + B1 | y = A1*x + B2 |
| G COMPONENT | y = A2*x + B11 | y = A2*x + B12 |
| B COMPONENT | y = A3*x + B21 | y = A3*x + B22 |

FIG. 16

| 211 COEFFICIENT TABLE (R COMPONENT) | | CORRECTION COEFFICIENTS $\alpha r, \alpha g, \alpha b$ |
|---|---|---|
| | GROUP R1 | xa1, xa2, xa3 |
| | GROUP R2 | xb1, xb2, xb3 |
| | GROUP R3 | xc1, xc2, xc3 |

| 212 COEFFICIENT TABLE (G COMPONENT) | | CORRECTION COEFFICIENTS $\beta r, \beta g, \beta b$ |
|---|---|---|
| | GROUP G1 | ya1, ya2, ya3 |
| | GROUP G2 | yb1, yb2, yb3 |
| | GROUP G3 | yc1, yc2, yc3 |

| 213 COEFFICIENT TABLE (B COMPONENT) | | CORRECTION COEFFICIENTS $\gamma r, \gamma g, \gamma b$ |
|---|---|---|
| | GROUP B1 | za1, za2, za3 |
| | GROUP B2 | zb1, zb2, zb3 |
| | GROUP B3 | zc1, zc2, zc3 |

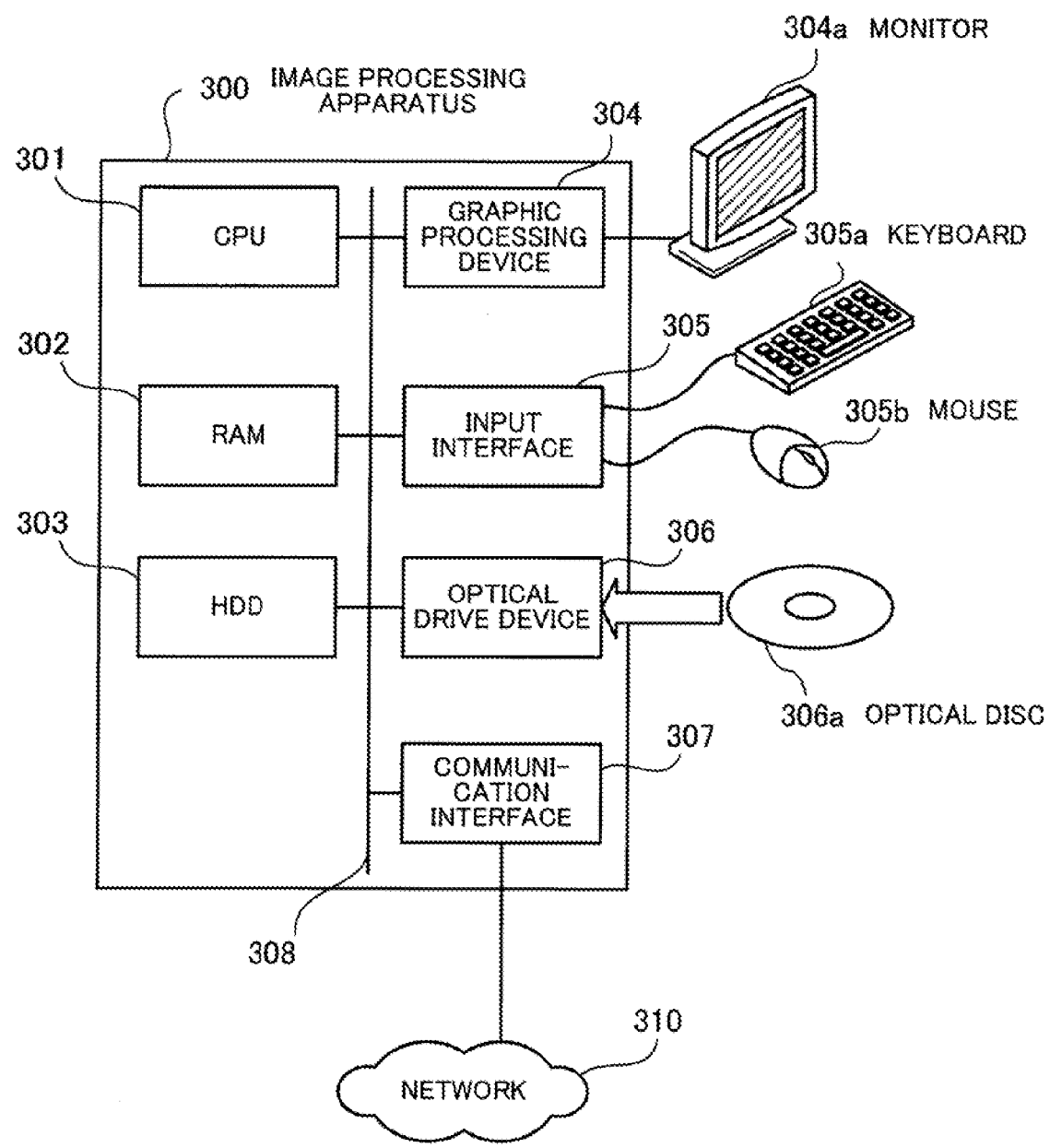

IMAGE PROCESSING APPARATUS AND IMAGE PICKUP APPARATUS

CROSS-REFERENCE TO RELATED APPLICATION

This application is based upon and claims the benefit of priority of the prior Japanese Patent Application No. 2011-222882, filed on Oct. 7, 2011, the entire contents of which are incorporated herein by reference.

FIELD

The embodiments discussed herein are related to an image processing apparatus and an image pickup apparatus.

BACKGROUND

Spectral sensitivity characteristics of an image pickup device having sensitivity to not only the visible region but also the infrared region largely depart from the color match sensitivity. For this reason, in order to take a color image close to what human eyes would see using such an image pickup device, an infrared cut filter is generally disposed in the optical path extending to the image pickup device. In addition, by providing a mechanism to move the infrared cut filter out of the optical path, it is possible to use the image pickup device for both color imaging and highly sensitive imaging, such as night vision imaging.

On the other hand, another method to acquire a color image using the above-mentioned image pickup device is to apply color correction by signal processing to image signals obtained by the image pickup device. Compared to disposing an infrared cut filter, the color correction by signal processing has an advantage in allowing the size of an image pickup apparatus to be reduced, and, in general, has an advantage also in terms of the manufacturing cost. Further, the color correction method facilitates switching between color imaging and highly sensitive imaging.

One example of the color correction method by signal processing is to perform signal processing using matrix coefficients. For example, a technology has been proposed in which matrix coefficients are calculated by the method of least squares based on a relationship between colors in an image obtained by imaging without the use of an infrared cut filter (correction object colors) and colors in an image obtained by imaging with the use of an infrared cut filter (target colors) and the color correction is performed using the calculated matrix coefficients.

Please see, for example, yoshitaka Toyoda et al., "*Near infrared cameras to capture full color images—A study of color reproduction methods without an infrared cut filter for digital color cameras*", The journal of the Institute of Image Information and Television Engineers, pages 101-110, 2010-01, The Institute of Image Information and Television Engineers.

SUMMARY

According to one aspect, there is provided an image processing apparatus including a determining unit and an image correcting unit. The determining unit determines which one of a plurality of divided areas in color distribution a value of an input image signal falls within. The plurality of divided areas are defined for each of color components included in the input image signal, and the determining unit determines, for each of the color components, which one of the plurality of divided areas the value of the input image signal falls within. The image correcting unit reads correction coefficients corresponding to the determined divided area for each color component from a correction coefficient storing unit in which correction coefficients are registered for each of the color components and each of the divided areas. Subsequently, based on the input image signal, the image correcting unit calculates output values for the individual color components of an output image signal using the correction coefficients of the individual color components read from the correction coefficient storing unit.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 15 illustrates an example of a demarcation line table;

FIG. 16 illustrates an example of correction coefficient tables;

FIG. 19 illustrates a hardware configuration of an image processing apparatus according to a third embodiment.

DESCRIPTION OF EMBODIMENTS

Figure 1:
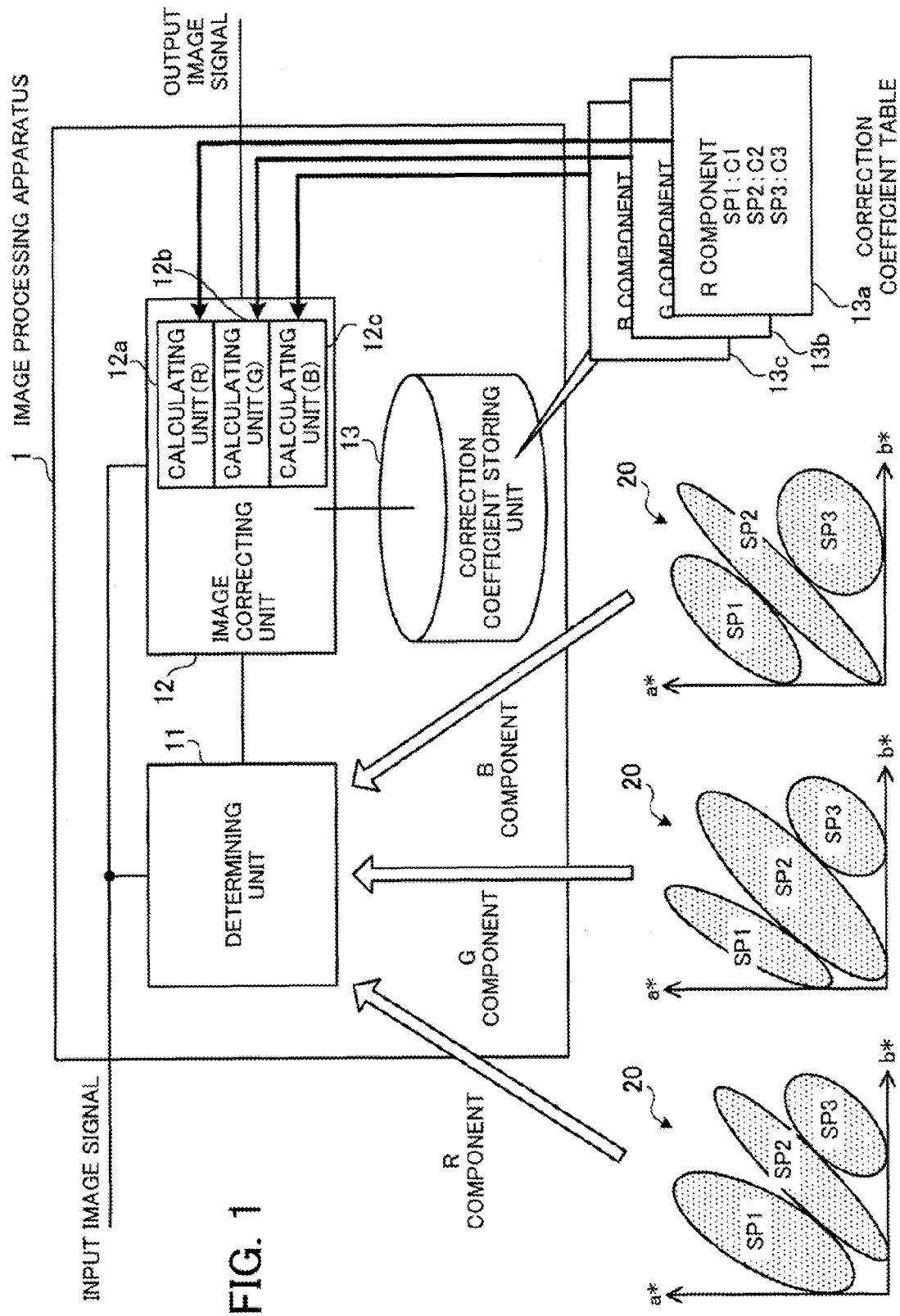
FIG. 1 illustrates an image processing apparatus according to a first embodiment.

The color correction by signal processing using matrix coefficients leaves the problem that the degree of the correction is different depending on the correction object color, which reduces the color reproduction of a color image. In addition, the image correction accuracy is decreased not only for the color correction for image signals obtained when imaging is performed without an infrared cut filter, but also in the case where the degree of the image correction by signal processing is different depending on the correction object color.

Several embodiments will be described below with reference to the accompanying drawings, wherein like reference numerals refer to like elements throughout.

(a) First Embodiment

FIG. 1 illustrates an image processing apparatus according to a first embodiment. An image processing apparatus 1 of FIG. 1 includes a determining unit 11, an image correcting unit 12, and a correction coefficient storing unit 13. Individual processes performed by the determining unit 11 and the image correcting unit 12 are implemented, for example, by a central processing unit (CPU) of the image processing apparatus 1 executing predetermined programs. The correction coefficient storing unit 13 is implemented as a nonvolatile storage device, such as a hard disk drive (HDD). Note that the correction coefficient storing unit may be provided, for example, external to the image processing apparatus 1.

The determining unit 11 determines which one of a plurality of divided areas in the color distribution a value of an input image signal input to the image processing apparatus 1 falls within. Here, the plurality of divided areas is defined with respect to each color component included in the input image signal. The determining unit 11 determines, for each color component, which one of the plurality of divided areas the value of the input image signal falls within. If, for example, the input image signal includes an R (red) component, a G (green) component, and a B (blue) component, the plurality of divided areas is individually defined with respect to each of the R, G, and B components. According to the example of FIG. 1, three divided areas SP1 to SP3 are defined for each of the R, G, and B components.

The divided areas are defined by, for example, dividing a color distribution coordinate system of a predetermined color system. The color distribution coordinate system in which the divided areas are defined may be a coordinate system in the same color system as that of the input image signal, or a coordinate system in a different color system from that of the input image signal. In addition, the color distribution coordinate system in which the divided areas are defined may be, for example, a coordinate system of the chromaticity distribution.

According to the example of FIG. 1, the divided areas are defined by dividing a coordinate system 20 with a* and b* components in the L*a*b* color system. Here, the coordinate system 20 represents a range which values of the a* and b* components based on the input image signal may fall within. As illustrated in the example, in the case where the color distribution coordinate system 20, in which the divided areas are defined, is a coordinate system in a different color system from that of the input image signal, the determining unit 11 converts the input image signal into a value of the same color system as that of the color distribution coordinate system 20. Subsequently, the determining unit 11 determines, for each color component included in the input image signal, which one of the divided areas the converted value falls within. In the example of FIG. 1, the determining unit 11 converts the input image signal which is a signal in the RGB color system into a signal in the L*a*b* color system. Subsequently, with respect to each of the R, G, and B components, the determining unit 11 determines which one of the divided areas each value of the a* component and the b* component among the converted signal components falls within.

As illustrated in FIG. 1, it is possible to arbitrarily define the divided areas SP1 to SP3 with respect to each of the R, G, and B components. For example, the divided area SP1 for the R component and the divided area SP1 for the G component may be defined in different areas in the coordinate system 20.

Note that in the example of FIG. 1, three divided areas are defined for each of the R, G, and B components, however, the number of divided areas defined for each component may be an arbitrary number greater than or equal to two.

Further, the number of divided areas defined for the individual R, G, and B components may not be the same. Here, what type of color distribution coordinate system is used to define the divided areas may be determined taking into consideration, for example, ease of defining the divided areas (for example, ease of setting the boundary between two adjacent divided areas) and ease of the determination procedure of the determining unit 11. For example, defining the divided areas in a coordinate system of a different color system from that of the input image signal may lead to effects such as allowing the processing procedure of the determining unit 11 to be simplified and enabling the amount of information required for the determination process of the determining unit 11 to be reduced.

The image correcting unit 12 performs a correction operation on the input image signal and outputs a corrected image signal. The image correcting unit 12 calculates an output value for each color component of the output image signal using a correction coefficient for the color component. In addition, the image correcting unit 12 reads a correction coefficient used in the correction operation of each color component from the correction coefficient storing unit 13. In the correction coefficient storing unit 13, correction coefficients are registered according to individual color components and individual divided areas.

Assume here that the image correcting unit 12 includes operation units 12a to 12c. Assume also that the correction coefficient storing unit 13 includes correction coefficient tables 13a to 13c in each of which correction coefficients are registered for a corresponding one of the R, G, and B components. The operation unit 12a calculates a value of an R component of the output image signal using a correction coefficient read from the correction coefficient table 13a. The operation unit 12b calculates a value of a G component of the output image signal using a correction coefficient read from the correction coefficient table 13b. The operation unit 12c calculates a value of a B component of the output image signal using a correction coefficient read from the correction coefficient table 13c.

In the correction coefficient table 13a, correction coefficients C1, C2, and C3 are registered in association with the respective divided areas SP1, SP2, and SP3 defined for the R component. Although no illustration is given, similarly in the correction coefficient table 13b, correction coefficients C1, C2, and C3 are registered in association with the respective divided areas SP1, SP2, and SP3 defined for the G component. Also in the correction coefficient table 13c, correction coefficients C1, C2, and C3 are registered in association with the respective divided areas SP1, SP2, and SP3 defined for the B component.

For each of the correction coefficient tables 13a to 13c, the correction coefficients C1 to C3 may be arbitrarily set. In addition, in each of the correction coefficient tables 13a to 13c, the same correction coefficient may be registered for a plurality of divided areas. In other words, a single correction coefficient may be associated with a plurality of divided areas (that is, discontinuous areas in the coordinate system 20) for each of the R, G, and B components.

The image correcting unit 12 reads, from the correction coefficient storing unit 13, a correction coefficient corresponding to a divided area for each color component, within which divided area the determining unit determines that the value of the input image signal falls. Subsequently, based on the input image signal, the image correcting unit 12 calculates an output value for each color component of the output image signal using a correction coefficient corresponding to the color component read from the correction coefficient storing unit 13.

Assume in FIG. 1 that the determining unit 11 determines that, for the R component, individual values of the a* component and the b* component based on the input image signal fall within the divided area SP1. In this case, the operation unit 12a of the image correcting unit 12 reads, from the correction coefficient table 13a, the correction coefficient C1 associated with the divided area SP1 and calculates an output value of the R component using the read correction coefficient C1. Assume also that the determining unit 11 determines that, for the G component, individual values of the a* component and the b* component based on the input image signal fall within the divided area SP2. In this case, the operation unit 12b of the image correcting unit 12 reads, from the correction coefficient table 13b, the correction coefficient C2 associated with the divided area SP2 and calculates an output value of the G component using the read correction coefficient C2.

The image processing apparatus 1 as described above enables image quality to be corrected using appropriate correction coefficients corresponding to the value of the input signal. Accordingly, even in the case where the degree of the image quality correction due to the correction operation using the correction coefficients is different depending on the value of the input image signal, it is possible to increase the likelihood of an image after the correction having improved image quality. In particular, in the case where the degree of the image quality correction effect due to the correction operation (the degree of how much the value of the signal is appropriately adjusted due to the correction operation) is different for each color component, it is possible to select appropriate correction coefficients taking into consideration the degree of the effect for each color component according to the value of the input image signal. This improves correction accuracy.

For example, in the case where the degree of the image quality correction effect due to the correction operation is different according to a value of the input image signal, the correction accuracy is increased by performing the correction operation using different correction coefficients according to the value of the input image signal. However, the method of determining which one of a plurality of divided areas commonly defined among the color components the value of the input signal falls within does not obtain a high correction accuracy if the degree of the image quality correction effect due to the correction operation is different for each of the color components. In order to improve the correction accuracy, it is necessary to increase the number of divided areas and also increase the number of correction coefficients corresponding to the divided areas.

On the other hand, as this embodiment, the method of determining which one of a plurality of divided areas defined with respect to each color component the value of the input image signal falls within is capable of increasing the correlation accuracy using a small number of correction coefficients even if the degree of the image quality correction effect due to the correction operation is different for each color component. If, for example, the case where nine correction coefficients are provided using the above-described method of commonly defining divided areas among color components is compared to the case where three correction coefficients for each of the R, G, and B components are provided according to this embodiment, this embodiment makes available twenty-seven combinations of correction processing by the image correcting unit 12. Accordingly, it is possible to perform accurate correction using a small number of correction coefficients.

(b) Second Embodiment

Next described is an example of an image pickup apparatus in which the process of the above-described image processing apparatus 1 is used for color correction of an image obtained by an image pickup device having sensitivity to both the visible region and the infrared region.

Figure 2:
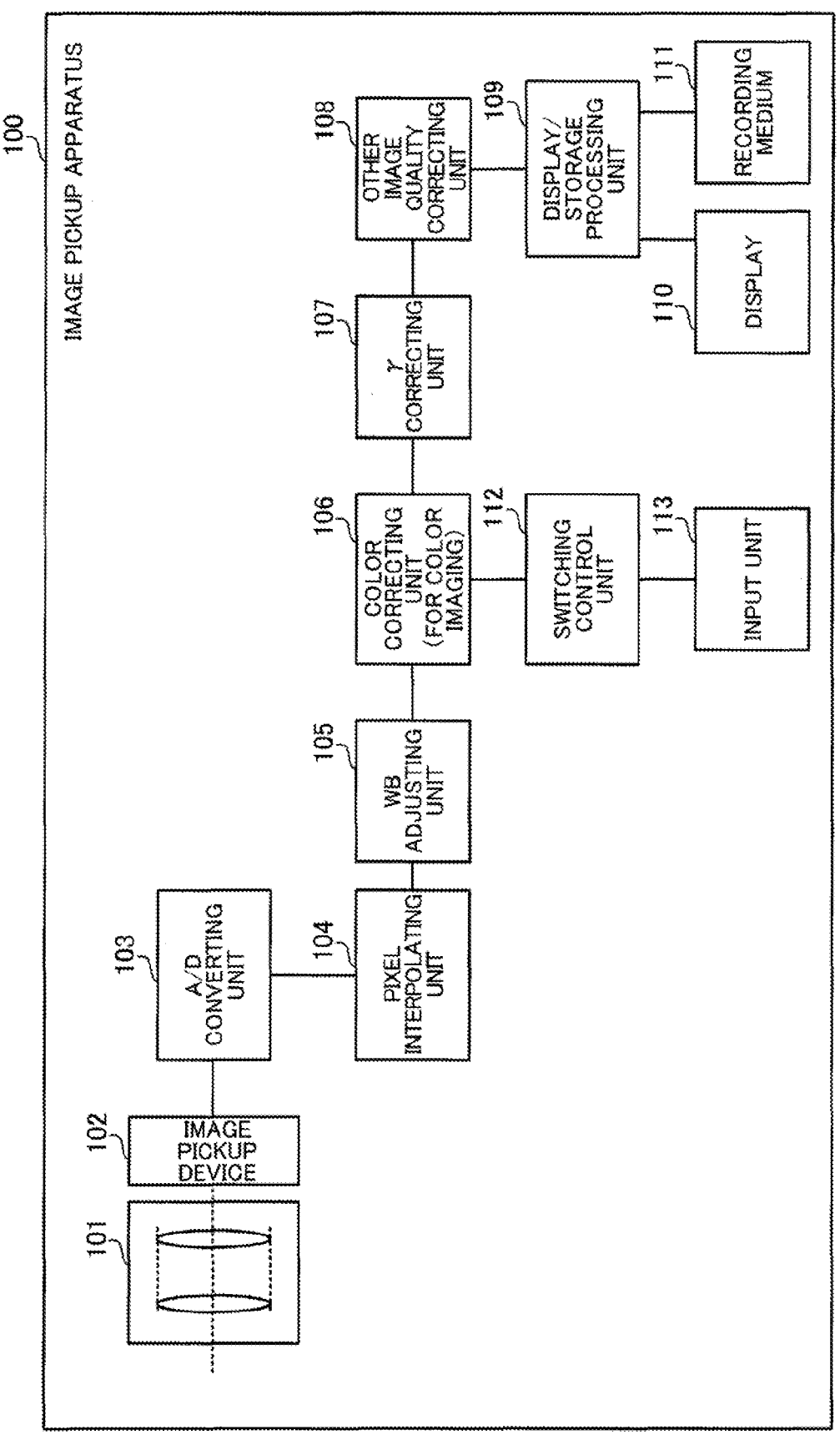
FIG. 2 illustrates a configuration example of an image pickup apparatus according to a second embodiment.

FIG. 2 illustrates a configuration example of an image pickup apparatus according to the second embodiment.

An image pickup apparatus 100 of FIG. 2 includes an optical block 101, an image pickup device 102, an analog/digital (A/D) converting unit 103, a pixel interpolating unit 104, a white balance (WB) adjusting unit 105, a color correcting unit 106, a γ correcting unit 107, an other image quality correcting unit 108, a display/storage processing unit 109, a display 110, a recording medium 111, a switching control unit 112, and an input unit 113. Note that the image pickup apparatus 100 is used, for example, not only as a general home-use digital still camera but also as a professional-use camera such as a surveillance camera.

The optical block 101 includes, for example, a lens for focusing light from an object onto the image pickup device 102. The image pickup device 102 is, for example, a charge coupled device (CCD) solid-state image pickup device or a complementary metal oxide semiconductor (CMOS) solid-state image pickup device, and converts light incident thereon from the object through the optical block 101 into an electrical signal. The image pickup device 102 has sensitivity to the visible region and the infrared region. Note that the optical block 101 does not have an infrared cut filter used to prevent infrared light from reaching the image pickup device 102.

The A/D converting unit 103 converts an analog image signal output from the image pickup device 102 into a digital image signal. The pixel interpolating unit 104 performs a pixel interpolation process based on the image signal output from the A/D converting unit 103, to thereby output signals for the individual R, G, and B components with respect to each pixel. The WB adjusting unit 105 adjusts white balance by increasing a gain of each of the signals for the R, G, and B components output from the pixel interpolating unit 104.

The color correcting unit 106 performs a color correction process on the image signal output from the WB adjusting unit 105 at the time of color imaging. Since the optical block 101 does not have an infrared cut filter, as described above, colors of the image obtained from the image pickup device 102 are different from colors of the object perceived by the human eye. The color correcting unit 106 is configured to improve color reproduction in such a manner that the colors of the image obtained from the image pickup device 102 come close to the colors of the object perceived by the human eye.

According to this embodiment, the color correcting unit 106 performs the color correction process using a matrix operation. The color correcting unit 106 performs the matrix operation according to the following Expression (1) where Rin, Gin, and Bin are the values of the individual R, G, and B components of the input image signal input from the WB adjusting unit 105 to the color correcting unit 106, and Rout, Gout, and Bout are the values of the individual R, G, and B components of the output image signal output from the color correcting unit 106 to the γ correcting unit 107.

$$\begin{pmatrix} Rout \\ Gout \\ Bout \end{pmatrix} = \begin{pmatrix} \alpha r & \alpha g & \alpha b \\ \beta r & \beta g & \beta b \\ \gamma r & \gamma g & \gamma b \end{pmatrix} \begin{pmatrix} Rin \\ Gin \\ Bin \end{pmatrix} \quad (1)$$

Note that the color correction process of the color correcting unit 106 may be turned off in response to a request from the switching control unit 112. When the color correction process is off, the color correcting unit 106 outputs the input image signal from the WB adjusting unit 105 directly to the γ correcting unit 107.

The γ correcting unit 107 performs γ correction on the image signal output from the color correcting unit 106. The other image quality correcting unit 108 performs other types of image quality correction processes, such as chroma correction, on the image signal output from the γ correcting unit 107.

The display/storage processing unit 109 converts the image signal output from the other image quality correcting unit 108 into a display signal and outputs the display signal to the display 110. The display 110 is a display device, such as a liquid crystal display (LCD) and an organic electroluminescence (EL) display, and displays an image based on the display signal output from the display/storage processing unit 109. In addition, the display/storage processing unit 109 compresses and codes the image signal output from the other image quality correcting unit 108 using a predetermined compression method such as Joint Photographic Experts Group (JPEG) and records the coded image data in the recording medium 111. The recording medium 111 is a nonvolatile recording medium, such as a flash memory and a hard disk drive (HDD). Note that the display/storage processing unit 109 may record the image signal output from the other image quality correcting unit 108 in the recording medium 111, for example, as uncompressed raw data.

The switching control unit 112 turns on/off the color correction process of the color correcting unit 106 according to a selection signal output from the input unit 113. The switching control unit 112 turns on the color correction process of the color correcting unit 106 at the time of color imaging, and turns off the color correction process of the color correcting unit 106 at the time of highly sensitive imaging, such as night vision imaging.

The input unit 113 supplies, to the switching control unit 112, a selection signal according to an input operation by a user. Note that, in practice, in the case where highly sensitive imaging is set to be performed by the input unit 113, a process of converting an image obtained by imaging into an image in arbitrary two colors, such as a black-and-white image, is carried out, for example, by the other image quality correcting unit 108 inside the image pickup apparatus 100.

Next described is a process performed by the color correcting unit 106. First, procedures of other color correction methods (first and second color correction methods) and their problems are noted before the processing procedure of the color correcting unit 106 is described.

[First and Second Color Correction Methods]

Figure 3:
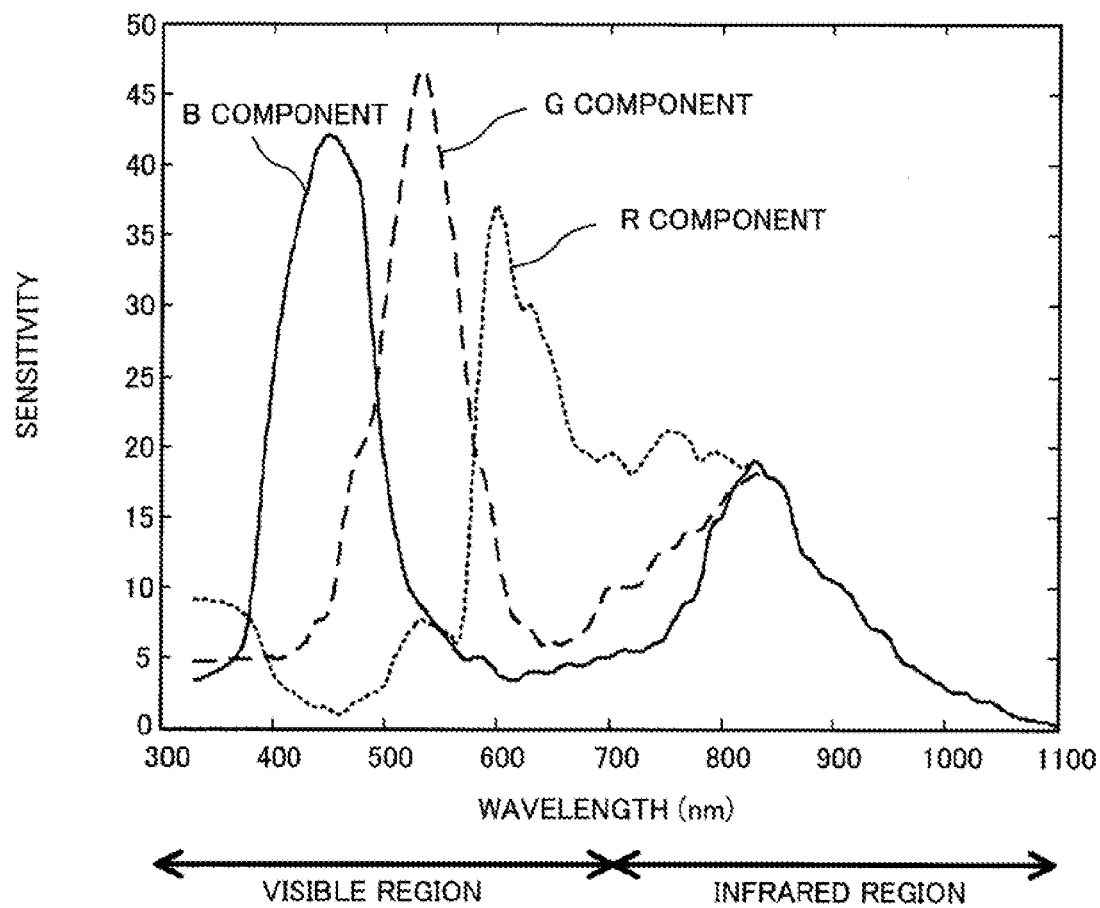
FIG. 3 is a graph illustrating an example of spectral sensitivity characteristics of an image pickup device.

FIG. 3 is a graph illustrating an example of spectral sensitivity characteristics of an image pickup device.

The image pickup device 102 used in this embodiment has sensitivity to the visible region and the infrared region, as illustrated in the example of FIG. 3. Since the image pickup device 102 has sensitivity to the infrared region that the human eye cannot see, the spectral sensitivity characteristics of the image pickup device 102 differ substantially from the sensitivity characteristics of the human retinal cone. Therefore, in the case of taking a color image using the image pickup device 102, a mechanism is required to cause the spectral reflectance characteristics of an image obtained by imaging to approximate the sensitivity characteristics of the human retinal cone. In general, there are two methods to achieve such a mechanism: disposing an infrared cut filter in the optical path of the image pickup device; and performing signal processing on an image signal obtained by the image pickup device without an infrared cut filter. The color correcting unit 106 of this embodiment performs color correction by the latter method.

Performing signal processing with matrix coefficients (hereinafter, referred to as the "first color correction method") is one example of a color correction method using signal processing. Toyota et al. mentioned above also describes one example of the first color correction method. In the first color correction method of Toyota et al., color correction is performed using a single matrix coefficient regardless of an input image signal. However, as described in Toyota et al., the first color correction method of Toyota et al. leaves the problem that the degree of the effect of color correction is different according to the imaging target color and the image quality may be degraded depending on the color.

Figure 4:
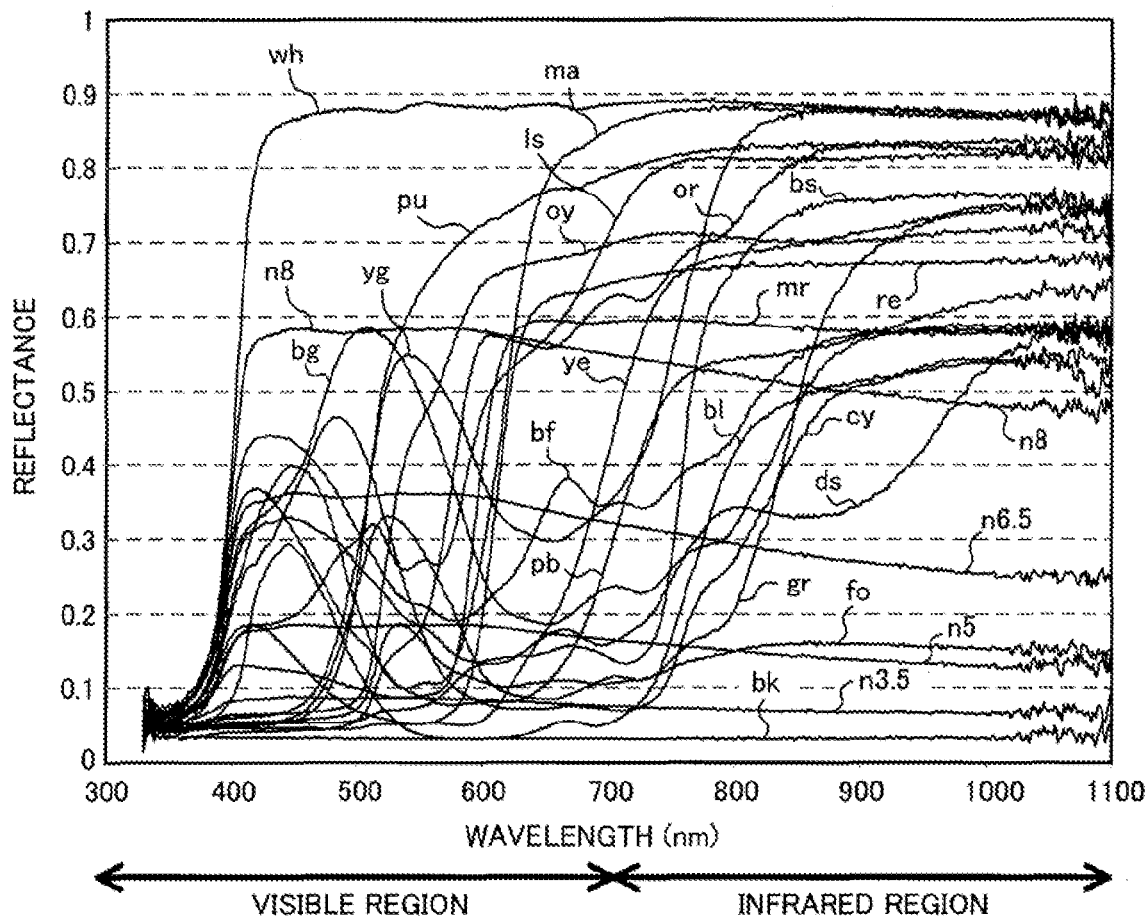
FIG. 4 is a graph illustrating an example of spectral reflectance characteristics of each color of the Macbeth color checker (registered trademark)

FIG. 4 is a graph illustrating an example of spectral reflectance characteristics of each color of the Macbeth color checker (registered trademark).

The image pickup device 102 having sensitivity to the infrared region, as illustrated in FIG. 3, detects more spectra in the infrared region as, for an imaging target color, the reflectance in the infrared region is higher than the reflectance in the visible region. As the spectral reflectance in the infrared region becomes high, intensity difference among the individual R, G, and B components of the signal of an obtained image becomes small, and therefore, the obtained image becomes close to achromatic. In addition, when images of individual imaging target colors are taken by the image pickup device 102 without an infrared cut filter, colors of the obtained images for all the imaging target colors become close to achromatic. However, the way that the color of each of the obtained images approaches the achromatic color is different since each of the imaging target colors has different spectral reflectance characteristics.

For example, in the case of taking images of individual 24 color samples of the Macbeth color checker (registered trademark) without an infrared cut filter, the way that the color of each of the obtained images approaches the achromatic color is different for each of the color samples. This is because each of the color samples has different spectral reflectance characteristics in the infrared region, as illustrated in FIG. 4.

In the above-described first color correction method, the differences in the reflectance characteristics in the infrared region among individual colors contribute to that the degree of the color correction effect is different for each of the imaging target colors. As a result, the first color correction method cannot obtain a high color correction accuracy in a comprehensive manner.

As an example of a method for solving the above-mentioned problem, performing color correction using a different matrix coefficient for each of the imaging target colors (the "second color correction method") is considered. According to the second color correction method, a higher color correction accuracy is expected as the imaging target colors are classified more finely. To put it the other way around, since the imaging target colors need to be classified finely in order to improve the color correction accuracy, the processing efficiency is reduced and a large amount of information on the color classification needs to be recorded in the image pickup apparatus.

Further, according to the spectral reflectance characteristics of FIG. 4, color samples having similar spectral reflectance characteristics in the visible region may have substantially different spectral reflectance characteristics in the infrared region. For example, blue-range color samples such as blue, cyan, and purple have similar spectral reflectance characteristics in the visible region, and have higher spectral reflectance in the infrared region than in the visible region. Accordingly, the differences in the spectral reflectance in the infrared region among the blue-range color samples have a significant influence on colors of an image taken without using an infrared cut filter. As a result, the way of approaching the achromatic color is significantly different among the color samples. This means that, in the case of applying the same matrix coefficient to colors that look similar to the human eye in the second color correction method, there is a limit to the color reproduction enhancing effect. In addition, in order to obtain a high color reproduction effect, it is necessary to classify the same type of colors, such as blue-range colors, more finely and apply a different matrix coefficient to each of the classified colors.

[Grouping Method for Correction Object Colors According to Second Embodiment]

In order to solve the above-described problems of the second color correction method, a method of changing classification of imaging target colors for each of the R, G, and B color components is considered. As an example, analysis results obtained from imaging of blue-range color samples are described with reference to FIGS. 5A and 5B to FIGS. 7A, 7B, and 7C.

Figures 5A, 5B:
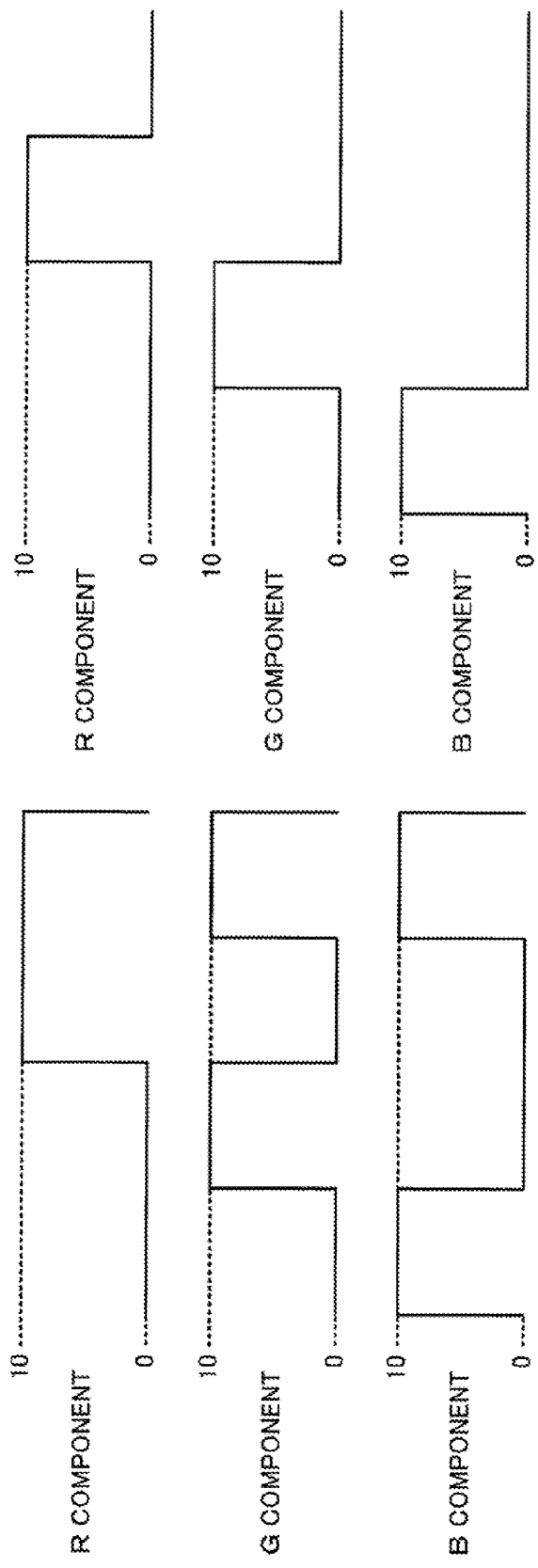
FIGS. 5A and 5B illustrate examples of spectral sensitivity characteristics of an image pickup device with respect to each color component.

FIGS. 5A and 5B illustrate examples of spectral sensitivity characteristics of an image pickup device with respect to each color component. FIG. 5A illustrates an example of the spectral sensitivity characteristics of the image pickup device 102 without an infrared cut filter disposed in an incident optical path. As illustrated in FIG. 5A, when no infrared cut filter is disposed in the incident optical path, the image pickup device 102 has sensitivity also to the infrared region with respect to all the R, G, and B components. On the other hand, FIG. 5B illustrates an example of the spectral sensitivity characteristics of the image pickup device 102 with an infrared cut filter disposed in the incident optical path. According to FIG. 5B, by disposing an infrared cut filter in the incident optical path, the sensitivity to the infrared region is reduced to almost zero for all the R, G, and B components.

Figure 6:
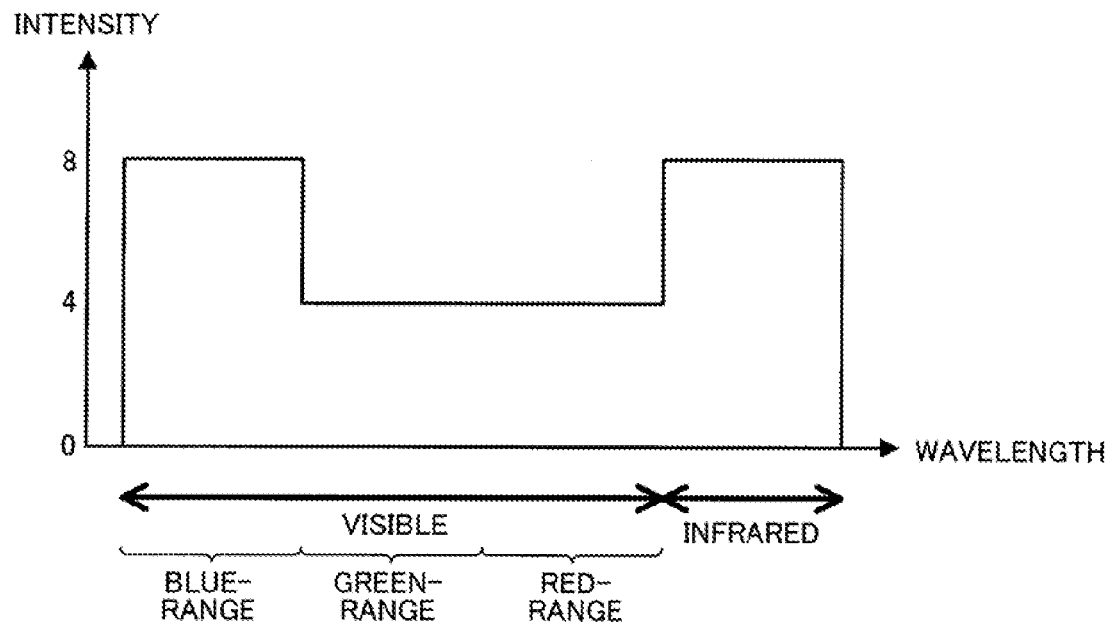
FIG. 6 illustrates an example of spectral reflectance characteristics of an imaging target blue-range color sample.

FIG. 6 illustrates an example of spectral reflectance characteristics of an imaging target blue-range color sample. As illustrated in FIG. 6, the blue-range color sample of the imaging target has a larger reflectance in a blue-range wavelength region and the infrared region than in green-range and red-range wavelength regions. R, G, and B values of an image signal obtained by imaging the color sample having the characteristics of FIG. 6 by the image pickup device 102 having the characteristics of FIGS. 5A and 5B are calculated by multiplying the spectral sensitivity of FIGS. 5A and 5B by the spectral reflectance of FIG. 6 with respect to each color component and integrating the multiplied result.

The R, G, and B values of an image signal obtained when an image is taken without an infrared cut filter (referred to as the "first R, G, and B values") are R=0.75, G=0.75, and B=1. Note that the first R, G, and B values have been standardized by values obtained when an image of white color is taken by the image pickup device 102 without an infrared cut filter. On the other hand, the R, G, and B values of an image signal obtained when an image is taken using an infrared cut filter (referred to as the "second R, G, and B values") are R=0.5, G=0.5, and B=1. Note that the second R, G, and B values have been standardized by values obtained when an image of white color is taken by the image pickup device 102 with an infrared cut filter.

Figures 7A, 7B, 7C:
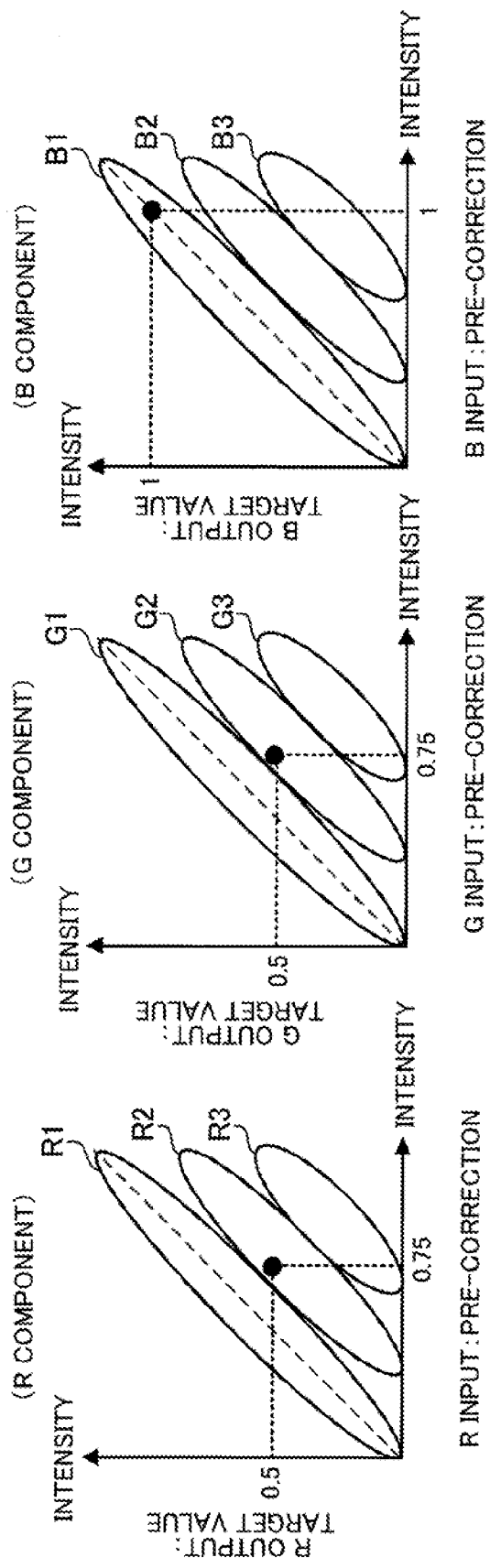
FIGS. 7A, 7B, and 7C are graphs illustrating input and output relationships for individual color components.

FIGS. 7A, 7B, and 7C are graphs illustrating input and output relationships for individual color components. The first R, G, and B values above are considered to correspond to the R, G, and B values of an input image signal input to the color correcting unit 106 (i.e., a pre-correction image signal). On the other hand, the second R, G, and B values are considered to be target values of an output image signal output from the color correcting unit 106 (target values after the correction). Accordingly, the graphs in FIGS. 7A, 7B, and 7C represent the input and output relationships for individual color components using the first R, G, and B values as the input and the second R, G, and B values as the output.

As illustrated in FIG. 7C, the value of the B component remains the same before and after the correction. On the other hand, for both the R and G components, the target value is smaller than the pre-correction value, as illustrated in FIGS. 7A and 7B.

It is here considered to classify color samples of imaging targets with respect to each color component based on the relationships between the pre-correction values and the target values. As an example, the color samples are classified into three groups for each of the R, G, and B color components, as illustrated in FIGS. 7A, 7B, and 7C. Groups R1 to R3 are defined for the R component, groups G1 to G3 are defined for the G component, and groups B1 to B3 are defined for the B component.

The groups R1 to R3 are, for example, divided by straight lines in the graph illustrating the input and output relationship of the R component. Into the group R1, each color sample whose pre-correction value is almost equal to the target value is classified. On the other hand, into the group R3, each color sample whose target value is extremely smaller compared to the pre-correction value is classified. Into the group R2, each color sample having intermediate characteristics between the characteristics of the color samples of the group R1 and the characteristics of the color samples of the group R3 is classified.

The relationship among the groups G1 to G3 for the G component is about the same as the relationship among the groups R1 to R3. The groups G1 to G3 are, for example, divided by straight lines in the graph illustrating the input and output relationship of the G component. The relationship among the groups B1 to B3 for the B component is also about the same as the relationship among the groups R1 to R3. The groups B1 to B3 are, for example, divided by straight lines in the graph illustrating the input and output relationship of the B component.

As illustrated in FIGS. 7A, 7B, and 7C, a blue-range color sample having characteristics as illustrated in FIG. 6 is classified into the group R2 for the R component, the group G2 for the G component, and the group B1 for the B component. Here it is expected that the correction accuracy is improved by performing the correction operation using the same correction coefficients for color samples classified into the same group.

In the case where an image of a color sample having characteristics as illustrated in FIG. 6 is taken, R component correction coefficients (corresponding to the first-row components of the matrix coefficients of Expression (1)) corresponding to the group R2 are used to calculate an R component output value, G component correction coefficients (corresponding to the second-row components of the matrix coefficients of Expression (1)) corresponding to the group G2 are used to calculate a G component output value, and B component correction coefficients (corresponding to the third-row components of the matrix coefficients of Expression (1)) corresponding to the group B1 are used to calculate a B component output value. This is expected to produce a favorable correction effect.

Here it is expected that values of the R and G component correction coefficients which belong to the groups having similar input and output relationships become close to each other. On the other hand, values of the B component correction coefficients whose input and output relationship is different from those of the R and G component correction coefficients are considered to be largely different from the values of the R and G component correction coefficients.

Figure 8:
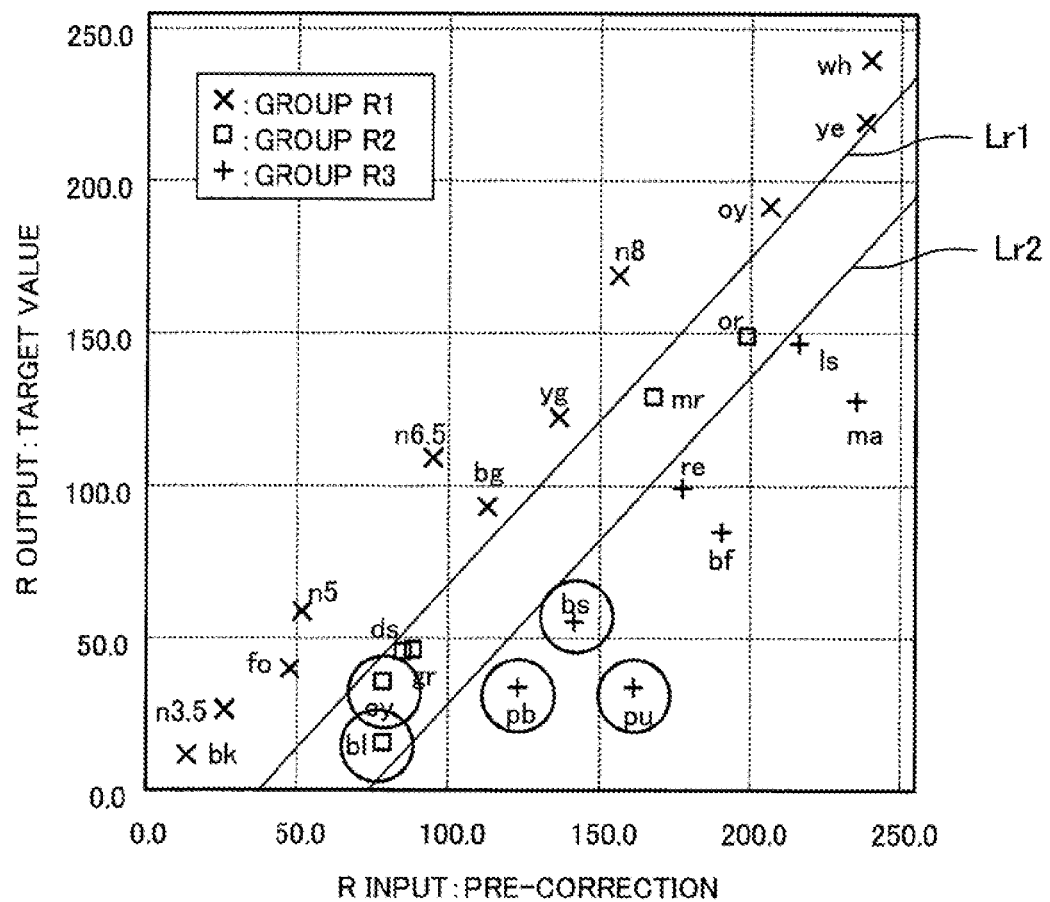
FIG. 8 is a graph illustrating an input and output relationship for an R component.
Figure 9:
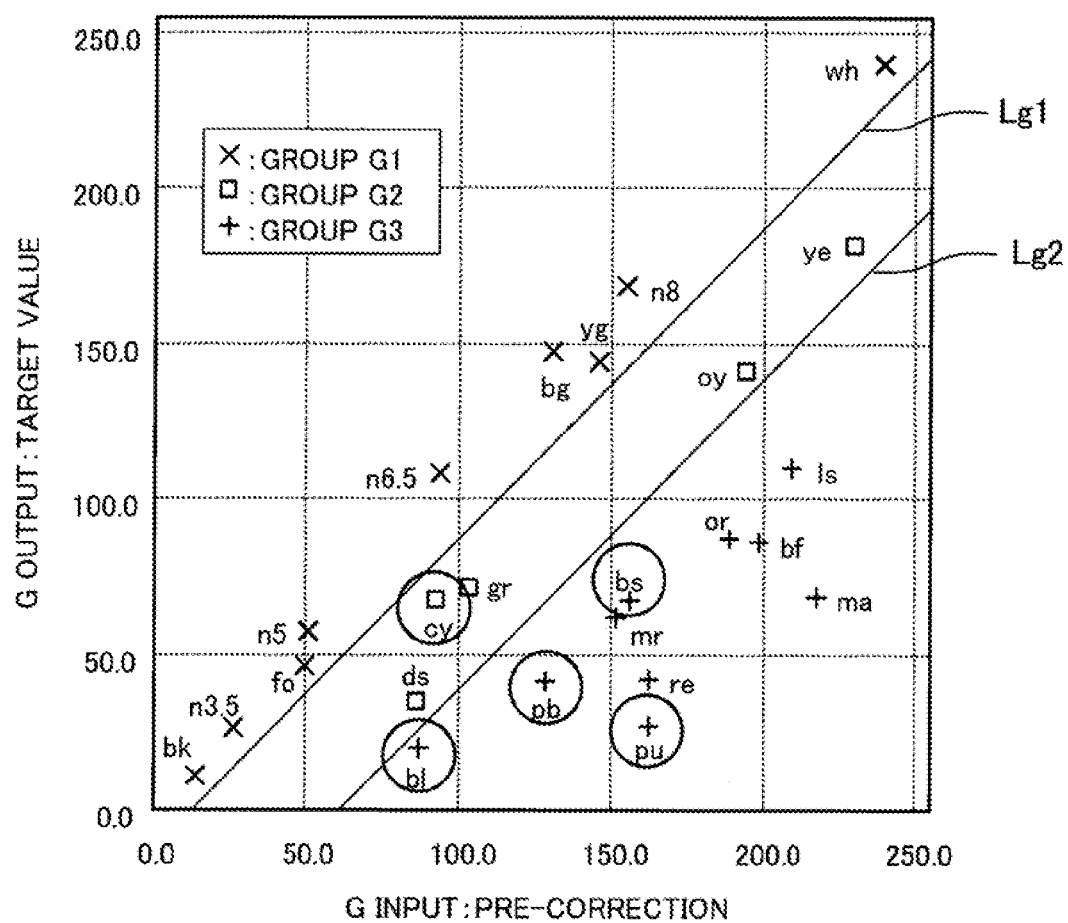
FIG. 9 is a graph illustrating the input and output relationship for a G component.
Figure 10:
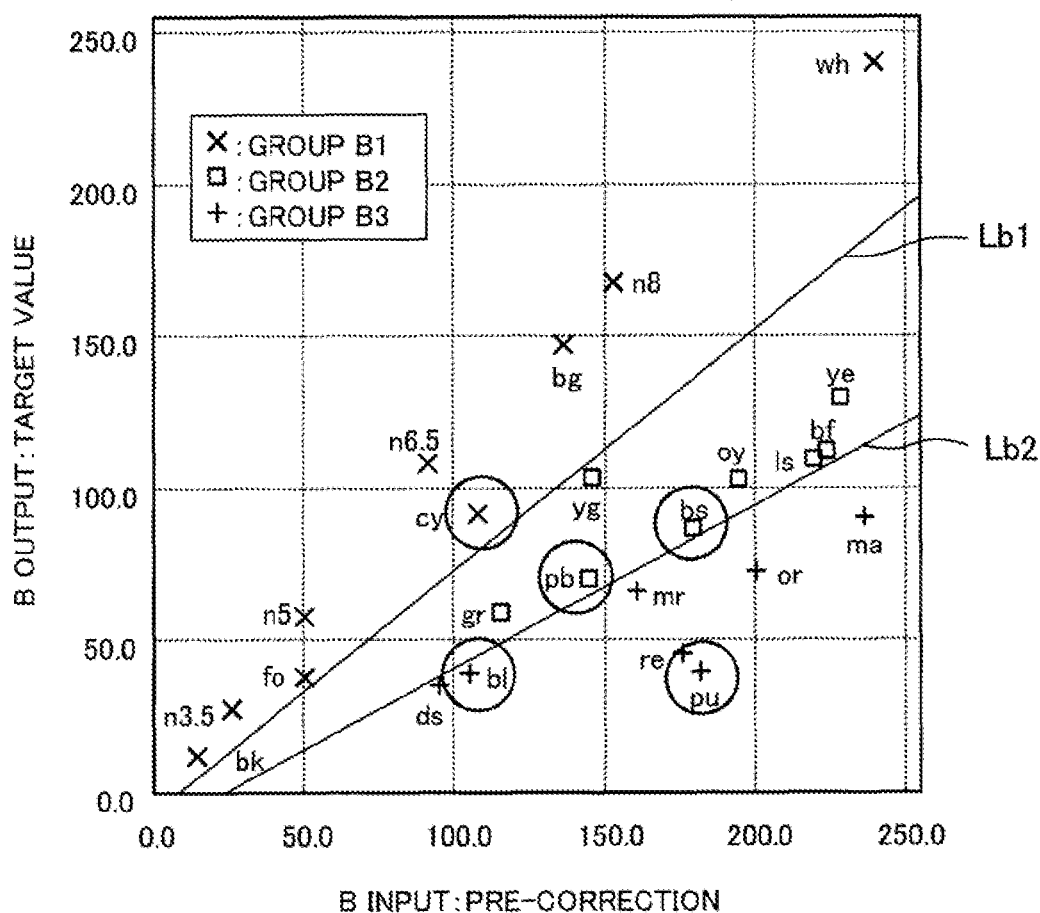
FIG. 10 is a graph illustrating the input and output relationship for a B component.

In view of the above-described analysis results, the relationship between the pre-correction values and the target values for the 24 colors of the Macbeth color checker (registered trademark) is represented in a graph with respect to each color component. FIG. 8 is a graph illustrating the input and output relationship for the R component. FIG. 9 is a graph illustrating the input and output relationship for the G component. FIG. 10 is a graph illustrating the input and output relationship for the B component.

In FIGS. 8 to 10, as examples, the 24 color samples are classified into three groups using two demarcation lines with respect to each color component. In FIG. 8, a boundary between the groups R1 and R2 is represented by a straight line Lr1, and a boundary between the groups R2 and R3 is represented by a straight line Lr2. In FIG. 9, a boundary between the groups G1 and G2 is represented by a straight line Lg1, and a boundary between the groups G2 and G3 is represented by a straight line Lg2. In FIG. 10, a boundary between the groups B1 and B2 is represented by a linear line Lb1, and a boundary between the groups B2 and B3 is represented by a linear line Lb2.

According to FIGS. 8 to 10, blue-range color samples are mostly classified: for the R component, close to the group R3; for the G component, close to the group G3; and for the B component, close to the group B1. On the other hand, red-range color samples are mostly classified: for the R component, close to the group R1; for the G component, close to the group G3; and for the B component, close to the group B3. In addition, green-range color samples are mostly classified, as in the case of the red-range color samples: for the R component, close to the group R1; for the G component, close to the group G3; and for the B component, close to the group B3.

Thus, the blue-range color samples and the red-range and green-range color samples exhibit different relationships between the pre-correction values and the target values for each color component. Because of this, the method of performing a correction operation using correction coefficients according to groups defined for each of the color components (row components of the matrix coefficients) yields better correction accuracy compared to the method of using matrix coefficients different for individual colors, as in the case of the above-described second color correction.

According to the second embodiment, color samples are divided into three groups using two demarcation lines (for example, the straight lines Lr1 and Lr2 for the R component) in a graph of the input and output relationship with respect to each color component. In the classification process, grouping of the individual color samples is performed for each color component in such a manner that, when a correction operation is performed using correction coefficients corresponding to individual groups, the difference between a color-component specific, post-correction output value of each color sample belonging to the same group and a color-component specific output value of a target color corresponding to the color sample falls within a predetermined range.

For example, for the R component, the straight line Lr1 which is a boundary between the groups R1 and R2 is set in such a manner that, when the correction operation is performed on each color sample belonging to the group R1 using the correction coefficients for the group R1, the difference between a post-correction R component value of the color sample and an R component target value corresponding to the color sample falls within a predetermined range. Note that the correction coefficients for the group R1 are obtained by, for example, the method of least squares using values of individual color samples belonging to the group R1 with respect to each of the R, G, and B components and R-component target values of the color samples.

According to FIGS. 8 to 10, color samples that look similar, such as red-range colors, green-range colors, and blue-range colors, are not always classified into the same group among three groups of each color component. In the example of FIGS. 8 to 10, locations of five blue-range color samples (blue sky, purple blue, purple, blue, and cyan) in the graphs are indicated by circles.

For example, in the case of the R component illustrated in FIG. 8, the five color samples are found across the two groups, R2 and R3, and in the case of the G component illustrated in FIG. 9, the five color samples are also found across the two groups, G2 and G3. In addition, in the case of the B component illustrated in FIG. 10, the five color samples are found across three groups, B1 to B3. Under such a condition, if the five blue-range color samples are classified into the same group and a correction operation is performed using the same correction coefficient for each color component, the margin of error between the post-correction value and the target value for each of the color samples is significant and, therefore, a high correction accuracy is not achieved. As in the case of the example, if the color samples are classified according to colors that look similar to the human eye, such as red-range colors, green-range colors, and blue-range colors, sufficient correction accuracy cannot be achieved.

The reason why a high color correction accuracy cannot be achieved in the case of performing the color correction using a matrix coefficient for each correction object color, as in the case of the above-described second color correction method, is considered to be because the relationship between the correction object colors and the post-correction target values is complicated, as described above.

According to the second embodiment, on the other hand, color samples whose post-correction values are close to their target values are classified into the same group, regardless of the human visual perception of color. As a result, the second embodiment is capable of improving the correction accuracy.

In addition, since the classification of groups is made with respect to each color component and correction coefficients are set for each of the groups, the number of patterns for matrix coefficients ultimately available for the color correction is equal to a value obtained by multiplying the number of groups for each color component. For example, in the case of defining three groups for each of the R, G, and B components, twenty-seven patterns of matrix coefficients are available for the color correction operation. Accordingly, despite the complication of the relationship between the correction object colors and their post-correction target values as described above, it is possible to have a smaller number of correction coefficients to be prepared in advance.

Figure 11:
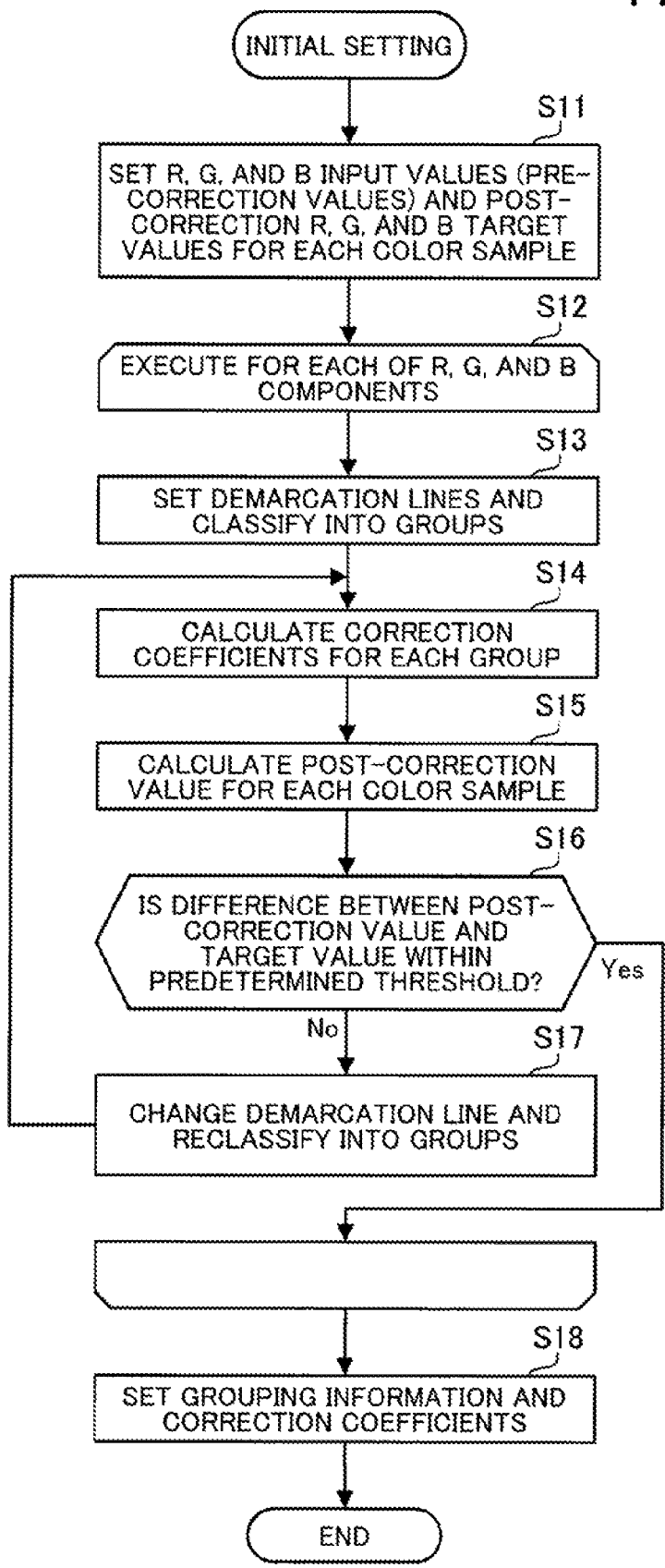
FIG. 11 is a flowchart illustrating an example of an initial setting procedure including grouping and setting of correction coefficients.

FIG. 11 is a flowchart illustrating an example of an initial setting procedure including grouping and setting of correction coefficients. The process of FIG. 11 is implemented in the developing operation or manufacturing operation of the image pickup apparatus 100. Note here that, as an example, the process of FIG. 11 is implemented by a computer (not illustrated).

[Step S11] An operator operating the computer sets, in the computer, pre-correction R, G, and B values and post-correction R, G, and B target values with respect to each of a plurality of color samples (for example, the 24 colors of the Macbeth color checker (registered trademark) described above). Here, the pre-correction R, G, and B values are obtained by taking an image of each color sample using an image pickup device without an infrared cut filter. The image pickup device used here has the same specifications as the image pickup device 102 of the image pickup apparatus 100. On the other hand, the post-correction R, G, and B target values are obtained by taking an image of each color sample using the same image pickup device with an infrared cut filter.

[Step S12] The computer executes the process of Steps S13 to S17 for each of the R, G, and B components.

[Step S13] The computer sets two demarcation lines in a graph indicating a relationship between inputs (pre-correction values) and outputs (post-correction target values) for a process-target color component. These two demarcation lines are set in such a manner that both the demarcation lines have positive slopes and do not cross each other on the input and output plane. The computer classifies the plurality of color samples into three groups by the two demarcation lines. For example, if the process target is the R component, the computer arbitrarily sets the straight lines Lr1 and Lr2 of FIG. 8, and classifies each of the 24 color samples into one of the groups R1 to R3 using the straight lines Lr1 and Lr2 as boundaries.

[Step S14] The computer calculates correction coefficients for each of the groups set in Step S13.

Assume here that n color samples (n is an integer greater than or equal to 1) belong to each group, and the matrix coefficients are obtained based on the following Expression (2).

$$\begin{pmatrix} Rout\_1 & Rout\_2 & \ldots & Rout\_n \\ Gout\_1 & Gout\_2 & \ldots & Gout\_n \\ Bout\_1 & Bout\_2 & \ldots & Bout\_n \end{pmatrix} = \begin{pmatrix} \alpha r & \alpha g & \alpha b \\ \beta r & \beta g & \beta b \\ \gamma r & \gamma g & \gamma b \end{pmatrix} \begin{pmatrix} Rin\_1 & Rin\_2 & \ldots & Rin\_n \\ Gin\_1 & Gin\_2 & \ldots & Gin\_n \\ Bin\_1 & Bin\_2 & \ldots & Bin\_n \end{pmatrix} \quad (2)$$

In Expression (2), $Rin\_1, Rin\_2, \ldots,$ and $Rin\_n$ represent pre-correction R component values of the individual color samples, $Gin\_1, Gin\_2, \ldots,$ and $Gin\_n$ represent pre-correction G component values of the individual color samples, and $Bin\_1, Bin\_2, \ldots,$ and $Bin\_n$ represent pre-correction B component values of the individual color samples. In addition, $Rout\_1, Rout\_2, \ldots,$ and $Rout\_n$ represent post-correction R component target values of the individual color samples, $Gout\_1, Gout\_2, \ldots,$ and $Gout\_n$ represent post-correction G component target values of the individual color samples, and $Bout\_1, Bout\_2, \ldots,$ and $Bout\_n$ represent post-correction B component target values of the individual color samples.

In Step S14, the computer assigns, for each group, pre-correction values and post-correction target values of color samples belonging to the group to Expression (2), and calculates matrix coefficients for the group by the method of least squares. In the case where the R component is a process target, correction coefficients of the individual groups of the R component are the first-row components ($\alpha r, \alpha g, \alpha b$) in the calculated matrix coefficients. In the case where the G component is a process target, correction coefficients of the individual groups of the G component are the second-row components ($\beta r, \beta g, \beta b$) in the calculated matrix coefficients. In the case where the B component is a process target, correction coefficients of the individual groups of the B component are the third-row components ($\gamma r, \gamma g, \gamma b$) in the calculated matrix coefficients.

[Step S15] The computer applies, with respect to each group, the correction coefficients calculated in Step S14 to Expression (2), to thereby calculate a post-correction color component value for each of the color samples.

[Step S16] For each of the color samples, the computer calculates the difference between the post-correction color component value calculated in Step S15 and the post-correction target value. The computer determines, for all the color samples, whether the difference is within a predetermined threshold. In the case where all the differences are within the predetermined threshold, the loop process for the process-target color component ends. On the other hand, if there is a color sample whose difference exceeds the predetermined threshold, the computer advances the process to Step S17.

[Step S17] The computer changes at least one of the two demarcation lines for the process-target color component and, then, performs the grouping of the color samples again. Subsequently, the process returns to Step S14. That is, in the loop process for a single color component, the demarcation line setting and the color sample grouping are repeated until the difference between the post-correction value and the target value for each of the entire color samples is within a predetermined value when the correction operation is performed using individual correction coefficients for the three groups.

Note that, in the above-described process, the grouping process is simplified by classifying the color samples into groups using the demarcation lines. However, the demarcation lines are not necessarily straight, and the grouping may be achieved using curve lines, for example. Using lines other than straight lines for the demarcation lines may further reduce the difference between the post-correction value and the target value with respect to all the color samples.

[Step S18] The computer generates, as information to be set in the image pickup apparatus 100, the correction coefficients for the individual groups and information indicating the grouping for each of the color components.

Here, the information indicating the grouping is information required when the color correcting unit 106 of the image pickup apparatus 100 determines a group to which an input image signal belongs. In Step S18, for example, each of the color samples used in Steps S11 to S17 is plotted in a color distribution coordinate system used for determining a group to which the input image signal belongs (hereinafter, referred to as the "determination coordinate system"). Then, an area including a position of a color sample in the determination coordinate system is associated, as a divided area, with a group to which the color sample belongs. With this, when a value of the input image signal input to the color correcting unit 106 is projected to the above-mentioned determination coordinate system, it is possible to determine which group the input image signal belongs to.

Coordinate systems likely to be used as the determination coordinate system include, for example, a three-dimensional, or more, coordinate system indicating distribution of the R, G, and B components in an RGB space and a two-dimensional coordinate system indicating chromaticity distribution in an L*a*b* space or a YUV space. Here, in the case where an RGB three dimensional space is used as the determination coordinate system, the color correcting unit 106 is able to perform the group determination without a color space (color system) conversion of the input image signal.

On the other hand, in the case where a two-dimensional coordinate system is used as the determination coordinate system, boundary setting between the divided areas in the determination coordinate system becomes easy. For example, the use of a two-dimensional coordinate system allows the boundaries of the divided areas defined for each color component to be set by demarcation lines each expressed in a simple mathematical form of a straight line, a curve line, a circle or the like. In addition, the use of a coordinate system with a* and b* components in an L*a*b* space as the determination coordinate system, as describes below, allows a reduction in the number of divided areas defined for each color component (that is, the number of divided areas to be individually associated with different correction coefficients). In this case, it is possible to reduce the amount of information to be set in the image pickup apparatus 100 for the group determination and simplify the determination processing procedure.

Figure 12:
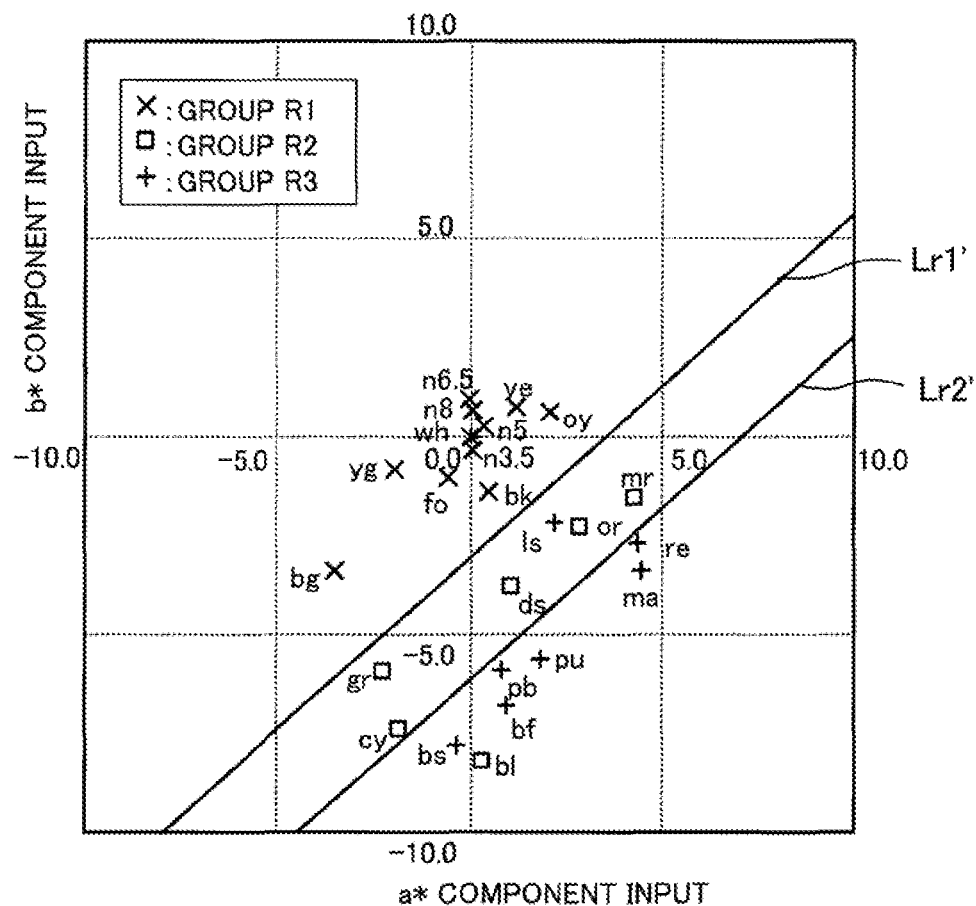
FIG. 12 is a first example of a graph in which pre-correction values of color samples are plotted in a chromaticity distribution coordinate system defined by axes of a* and b* components.
Figure 13:
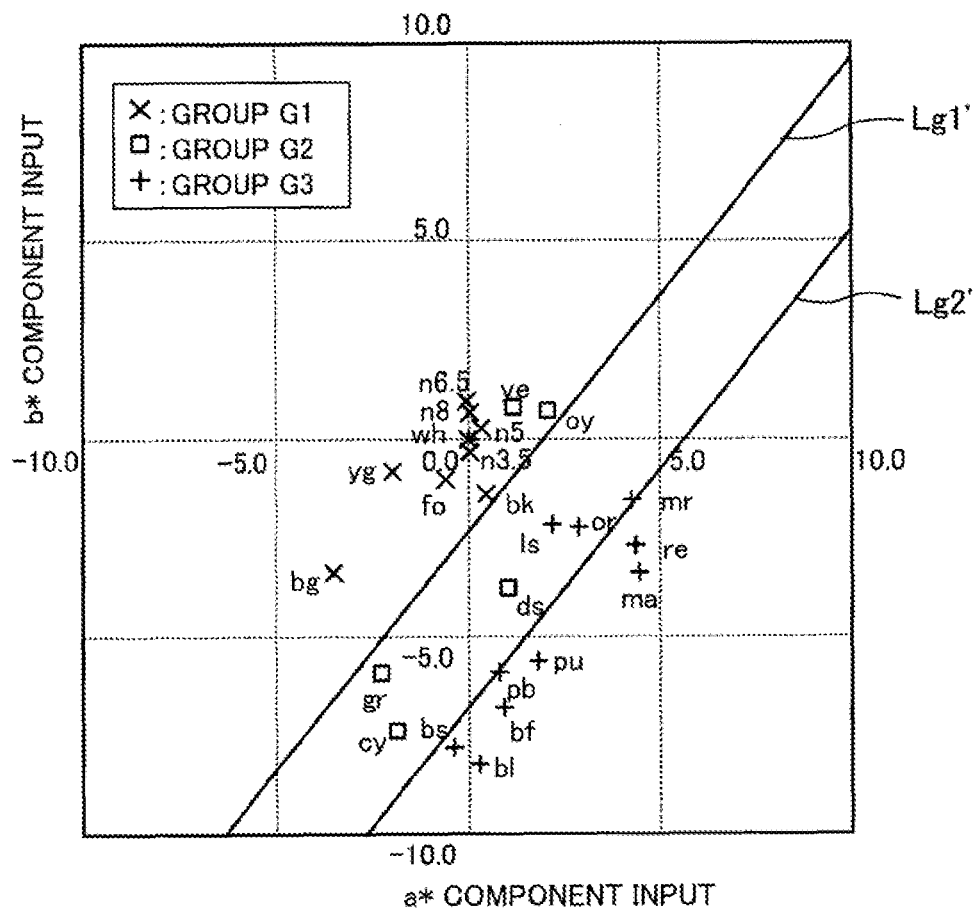
FIG. 13 is a second example of the graph in which the pre-correction values of the color samples are plotted in the chromaticity distribution coordinate system defined by the axes of the a* and b* components.
Figure 14:
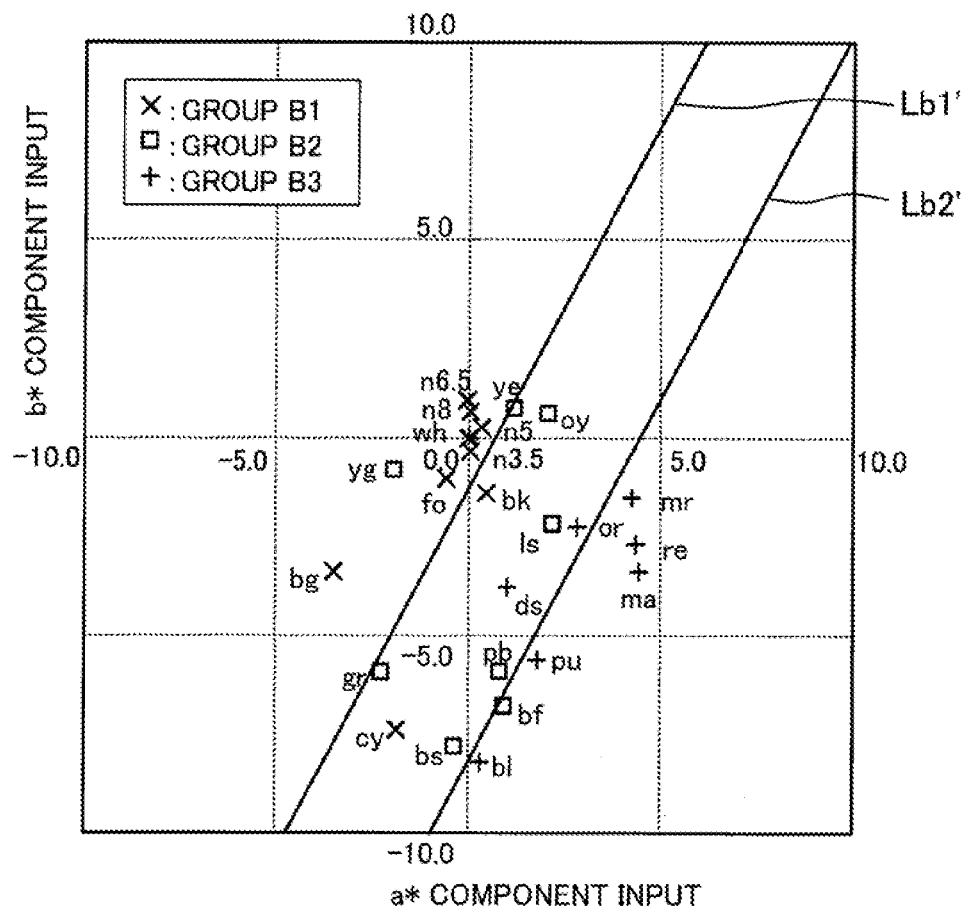
FIG. 14 is a third example of the graph in which the pre-correction values of the color samples are plotted in the chromaticity distribution coordinate system defined by the axes of the a* and b* components.

Each of FIGS. 12 to 14 illustrates an example of a graph in which the pre-correction values of the color samples are plotted in a chromaticity distribution coordinate system defined by axes of the a* and b* components. Note that FIG. 12 illustrates a case in which the color samples are classified as illustrated in FIG. 8; FIG. 13 illustrates a case in which the color samples are classified as illustrated in FIG. 9; and FIG. 14 illustrates a case in which the color samples are classified as illustrated in FIG. 10. In FIGS. 12 to 14, positions of the individual color samples in the coordinate systems are the same, however, groups to which the individual color samples belong are different. That is, FIGS. 12 to 14 are different from each other in the disposition of demarcation lines for the group classification.

According to FIG. 12, for the R component, it is possible to generally classify the individual color samples as illustrated in FIG. 8, using straight lines Lr1' and Lr2' in the coordinate system as boundaries. According to FIG. 13, for the G component, it is possible to generally classify the individual color samples as illustrated in FIG. 9, using straight lines Lg1' and Lg2' in the coordinate system as boundaries. According to FIG. 14, for the B component, it is possible to generally classify the individual color samples as illustrated in FIG. 10, using straight lines Lb1' and Lb2' in the coordinate system as boundaries. In the case of adopting the L*a*b* space conversion method as above, the image pickup apparatus 100 only has to have information illustrated in FIGS. 15 and 16, for example.

FIG. 15 illustrates an example of a demarcation line table. As the information indicating the grouping, the image pickup apparatus 100 only has to have, for example, information indicating demarcation lines in a chromaticity distribution coordinate system, as illustrated in FIG. 15. In a demarcation line table 200 of FIG. 15, for each of the R, G, and B components, a mathematical expression of a demarcation line 1 which forms a boundary between groups 1 and 2 and a mathematical expression of a demarcation line 2 which forms a boundary between groups 2 and 3 are registered. For example, for the R component, a mathematical expression of the straight line Lr1' of FIG. 12, which forms a boundary between the groups R1 and R2, and a mathematical expression of the straight line Lr2' of FIG. 12, which forms a boundary between the groups R2 and R3, are registered.

In Step S18 of FIG. 11, the computer sets the demarcation lines for each color component, for example, based on positions of the pre-correction values for the color samples in the chromaticity distribution coordinate system, and generates the demarcation line table 200 in which the mathematical expressions of the demarcation lines are registered.

Note that, in the example of FIG. 15, the demarcation lines 1 and 2 for the same color component have a common value of the slope, which simplifies the group determination process of the color correcting unit 106. However, the slopes of the demarcation lines 1 and 2 for the same color component may be arbitrarily set in such a manner that the demarcation lines 1 and 2 do not cross each other in the coordinate system. In addition, another example of the information indicating the grouping, held by the image pickup apparatus 100, is a table in which coordinate values in the coordinate system divided by each of the demarcation lines are associated with the individual groups.

FIG. 16 illustrates an example of correction coefficient tables. Note that correction coefficient tables 211 to 213 are commonly used when the color correcting unit 106 performs the group determination in any color space.

In the correction coefficient table 211, correction coefficients calculated for each group after the grouping process for the R component are registered. The correction coefficients for the individual groups are the first-row components ($\alpha r$, $\alpha g$, $\beta b$) in the matrix coefficients calculated in Step S14 when the condition in Step S16 is satisfied in the grouping process for the R component of FIG. 11.

In the correction coefficient table 212, correction coefficients calculated for each group after the grouping process for the G component are registered. The correction coefficients for the individual groups are the second-row components ($\beta r$, $\beta g$, $\beta b$) in the matrix coefficients calculated in Step S14 when the condition in Step S16 is satisfied in the grouping process for the G component of FIG. 11.

In the correction coefficient table 213, correction coefficients calculated for each group after the grouping process for the B component are registered. The correction coefficients for the individual groups are the third-row components ($\gamma r$, $\gamma g$, $\gamma b$) in the matrix coefficients calculated in Step S14 when the condition in Step S16 is satisfied in the grouping process for the B component of FIG. 11.

In Step S18 of FIG. 11, for example, the computer registers, in the correction coefficient tables 211 to 213, correction coefficients calculated for each group in the grouping process with respect to each color component.

Note that in the description of FIGS. 12 to 16 above, the demarcation lines defining the divided areas in the chromaticity distribution coordinate system are straight lines. However, the demarcation lines may be curved lines or circles, for example. In the case of setting circular demarcation lines, for example, a plurality of bounding circles having different radii with a predetermined position of the chromaticity distribution coordinate system at their center are set. For example, if two bounding circles are set, the inside of the inner bounding circle is associated with the first group, the area between the inner bounding circle and the outer bounding circle is associated with the second group, and the outside of the outer bounding circle is associated with the third group.

[Color Correction Processing According to Embodiment]

Figure 17:
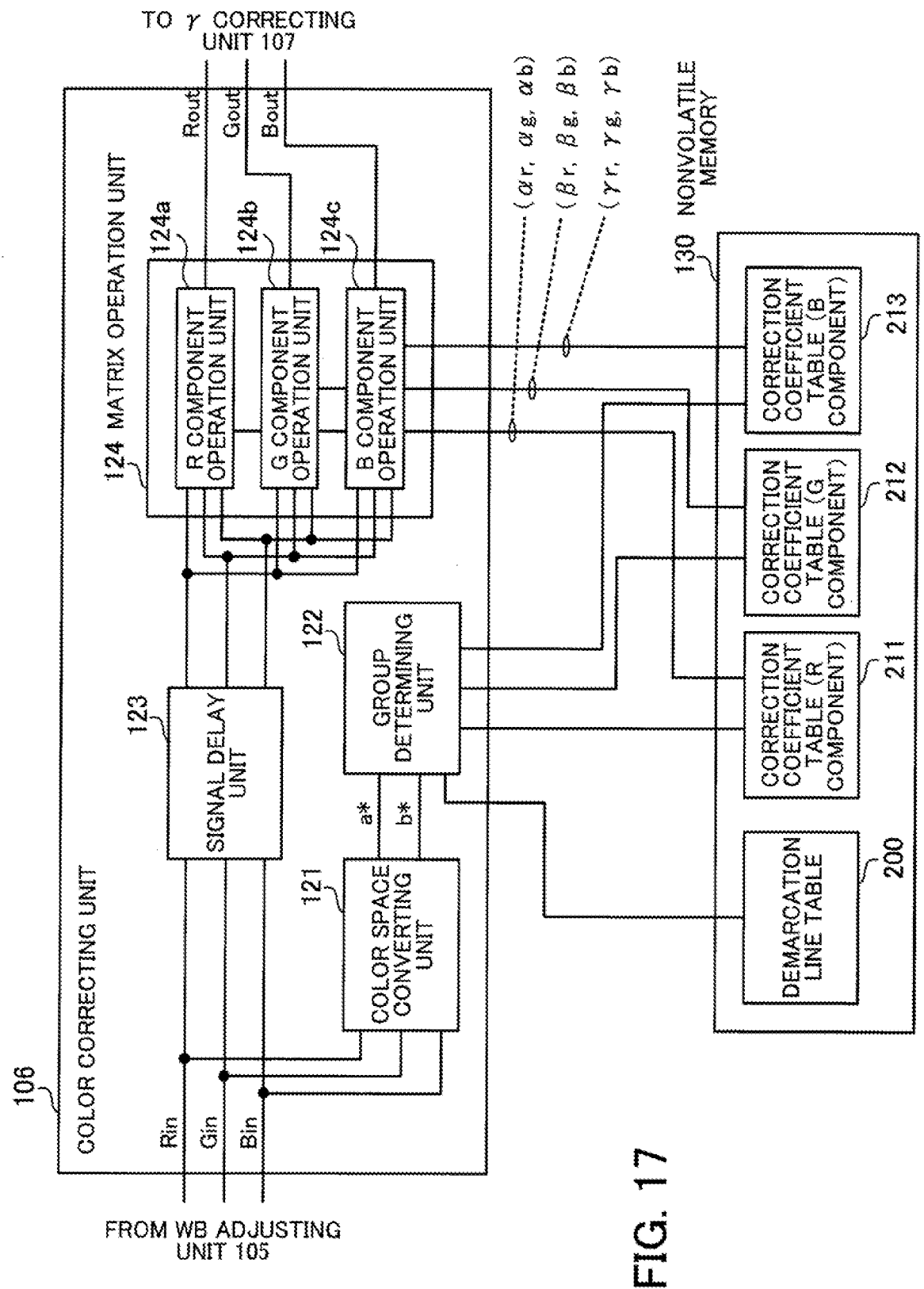
FIG. 17 is a block diagram illustrating an internal configuration example of a color correcting unit.

Next described is color correction processing executed by the image pickup apparatus 100. FIG. 17 is a block diagram illustrating an internal configuration example of a color correcting unit.

The color correcting unit 106 includes a color space converting unit 121, a group determining unit 122, a signal delay unit 123, and a matrix operation unit 124. In addition, the image pickup apparatus 100 includes a nonvolatile memory 130, in which the demarcation line table 200 and the correction coefficient tables 211 to 213 described above are stored. The color correcting unit 106 refers to each of the tables in the nonvolatile memory 130.

The color space converting unit 121 converts the individual R, G, and B component values (Rin, Gin, Bin) of an input image signal input to the color correcting unit 106 from the WB adjusting unit 105 into values of the L*a*b* space. The color space converting unit 121 outputs a* and b* component values obtained by the conversion to the group determining unit 122.

The group determining unit 122 refers to the demarcation line table 200, to thereby determine a group to which the input image signal belongs with respect to each color component based on the a* and b* component values output from the color space converting unit 121. The group determining unit 122 determines a group for the R component based on the two mathematical expressions associated with the R component in the demarcation line table 200. In addition, the group determining unit 122 determines a group for the G component based on the two mathematical expressions associated with the G component in the demarcation line table 200. In addition, the group determining unit 122 determines a group for the B component based on the two mathematical expressions associated with the B component in the demarcation line table 200.

The group determining unit 122 outputs correction coefficients associated with the group determined for the R component from the correction coefficient table 211 to the matrix operation unit 124. In addition, the group determining unit 122 outputs correction coefficients associated with the group determined for the G component from the correction coefficient table 212 to the matrix operation unit 124. In addition, the group determining unit 122 outputs correction coefficients associated with the group determined for the B component from the correction coefficient table 213 to the matrix operation unit 124.

The signal delay unit 123 outputs, to the matrix operation unit 124, the input image signal input to the color correcting unit 106 after delaying the output by a time period required for the processes of the color space converting unit 121 and the group determining unit 122. With this, the correction coefficients output to the matrix operation unit 124 from the correction coefficient tables 211 to 213 by the process of the group determining unit 122 match a pixel to which the correction coefficients are to be applied.

The matrix operation unit 124 executes a matrix operation according to the above-described Expression (1) based on R, G, and B component values of the image signal output from the signal delay unit 123. In the matrix operation, the matrix operation unit 124 uses matrix coefficients in which the correction coefficients output from the correction coefficient tables 211, 212, and 213 are set as the first-row components, second-row components, and third-row components, respectively.

The matrix operation unit 124 includes, for example, an R component operation unit 124a, a G component operation unit 124b, and a B component operation unit 124c. The R component operation unit 124a performs an operation of Rout=αr·Rin+αg·Gin+αb·Bin using the correction coefficients (αr, αg, αb) output from the correction coefficient table 211. The G component operation unit 124b performs an operation of Gout=βr·Rin+βg·Gin+βb·Bin using the correction coefficients (βr, βg, βb) output from the correction coefficient table 212. The B component operation unit 124c performs an operation of Bout=γr·Rin+γg·Gin+γb·Bin using the correction coefficients (γr, γg, γb) output from the correction coefficient table 213.

Figure 18:
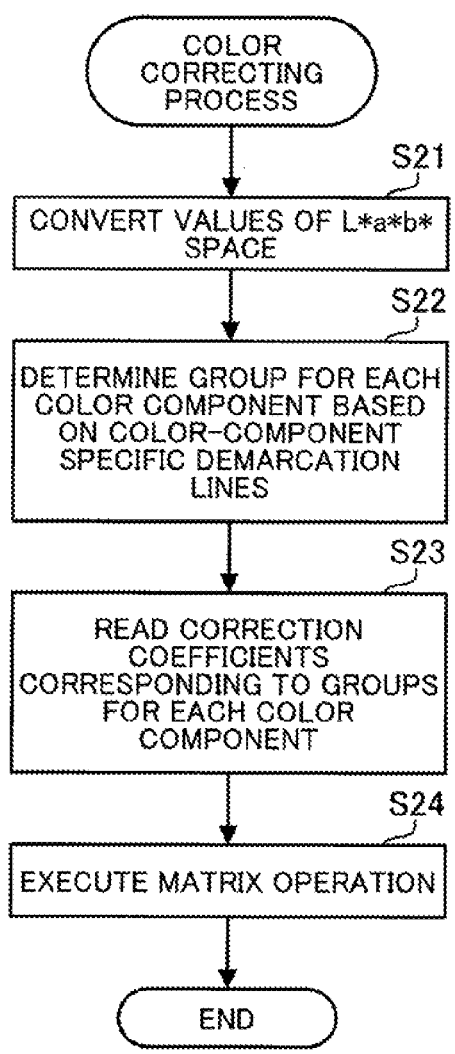
FIG. 18 is a flowchart illustrating an example of a color correction processing procedure by a color correcting unit.

FIG. 18 is a flowchart illustrating an example of a color correction processing procedure by a color correcting unit. FIG. 18 illustrates a process for an input image signal corresponding to one pixel, input to the color correcting unit 106.

[Step S21] The color space converting unit 121 converts the R, G, and B component values (Rin, Gin, Bin) of the input image signal into values in the L*a*b* space.

[Step S22] The group determining unit 122 determines a group to which the input image signal belongs with respect to each color component based on the demarcation lines registered in the demarcation line table 200 and the a* and b* component values output from the color space converting unit 121.

The group determining unit 122 determines a group for the R component, for example, in the following procedure based on the two mathematical expressions associated with the R component in the demarcation line table 200. The group determining unit 122 assigns the a* component value output from the color space converting unit 121 to x of the demarcation line 1 of the R component, to thereby calculate the value of y. In the case where the b* component value output from the color space converting unit 121 is more than the calculated y value, the group determining unit 122 determines that the input image signal belongs to the group R1. On the other hand, in the case where the b* component value is less than or equal to the y value, the group determining unit 122 assigns the a* component value to x of the demarcation line 2 of the R component, to thereby calculate the value of y. In the case where the b* component value is more than the calculated y value, the group determining unit 122 determines that the input image signal belongs to the group R2. On the other hand, in the case where the b* component value is less than or equal to the y value, the group determining unit 122 determines that the input image signal belongs to the group R3.

In addition, the group determining unit 122 determines a group for the G component in the same procedure for the R component, based on the two mathematical expressions associated with the G component in the demarcation line table 200. The group determining unit 122 also determines a group for the B component in the same procedure for the R component, based on the two mathematical expressions associated with the B component in the demarcation line table 200.

[Step S23] By the control of the group determining unit 122, correction coefficients associated with the determined group for the R component are read from the correction coefficient table 211 out to the matrix operation unit 124. In addition, by the control of the group determining unit 122, correction coefficients associated with the determined group for the G component are read from the correction coefficient table 212 out to the matrix operation unit 124. In addition, by the control of the group determining unit 122, correction coefficients associated with the determined group for the B component are read from the correction coefficient table 213 out to the matrix operation unit 124.

[Step S24] The R, G, and B component operation units 124a, 124b, and 124c of the matrix operation unit 124 individually calculate the R component output value Rout, the G component output value Gout, and the B component output value Bout, respectively, using the correction coefficients output from the correction coefficient tables 211, 212, and 213, respectively, based on the R, G, and B component values (Rin, Gin, Bin) of the input image signal which is a conversion object in Step S21. With this, a post-correction image signal is output from the matrix operation unit 124.

According to the second embodiment described above, it is possible to generate a color image with high color reproduction based on a signal of an image taken without an infrared cut filter. In addition, since a plurality of correction coefficients used for the color correction is prepared for each color component, the number of matrix coefficients available for the color correction is a value obtained by multiplying the number of the correction coefficients prepared for the individual color components by the number of the color components. This reduces the amount of data for correction coefficients preliminarily stored in the nonvolatile memory 130 of the image pickup apparatus 100, which leads to a reduction in the manufacturing cost and the circuit size of the image pickup apparatus 100.

(c) Third Embodiment

The process of the color correcting unit 106 according to the second embodiment may be implemented by an image processing apparatus external to an image pickup apparatus. In addition, the process of the image processing apparatus may be implemented by one or more semiconductor devices.

A third embodiment described here is one example of an image processing apparatus for performing the process of the color correcting unit 106. FIG. 19 illustrates a hardware configuration of an image processing apparatus according to the third embodiment. An image processing apparatus 300 of the third embodiment may be implemented as a computer as illustrated in FIG. 19.

The entire image processing apparatus 300 is controlled by a central processing unit (CPU) 301. To the CPU 301, a random access memory (RAM) 302 and a plurality of peripherals are connected via a bus 308.

The RAM 302 is used as a main storage device of the image processing apparatus 300. The RAM 302 temporarily stores at least part of an operating system (OS) program and application programs to be executed by the CPU 301. In addition, the RAM 302 stores various types of data required for processing by the CPU 301.

The peripherals connected by the bus 308 includes a hard disk drive (HDD) 303, a graphic processing device 304, an input interface (I/F) 305, an optical drive device 306, and a communication interface 307. The HDD 303 magnetically writes and reads data to and from a built-in magnetic disk. The HDD 303 is used as a secondary storage device of the image processing apparatus 300. In the HDD 303, the OS program, application programs, and various types of data are stored. Note that, as a secondary storage device, a semiconductor storage device such as a flash memory may be used.

To the graphic processing device 304, a monitor 304a is connected. The graphic processing device 304 causes the monitor 304a to display an image according to an instruction from the CPU 301. Note that the monitor 304a is, for example, a liquid crystal display.

To the input I/F 305, for example, a keyboard 305a and a mouse 305b are connected. The input I/F 305 transmits output signals from the keyboard 305a and the mouse 305b to the CPU 301. Note that the mouse 305b is one example of a pointing device, and other pointing devices, such as a touch panel, a tablet, a touch pad, and a trackball, may be used.

The optical drive device 306 reads data recorded on the optical disk 306a using laser light or the like. The optical disk 306a is a portable recording medium on which data is recorded in such a manner as to be read by reflection of light. Examples of the optical disk 306a include a digital versatile disc (DVD), a DVD-RAM, a compact disk read only memory (CD-ROM), a CD recordable (CD-R), and a CD rewritable (CD-RW).

The communication interface 307 is connected to a network 310. The communication interface 307 communicates with other apparatuses via the network 310.

The process of the color correcting unit 106 of the second embodiment is implemented, for example, by the CPU 301 executing a predetermined program. In addition, at least part of the process of the color correcting unit 106 may be implemented by a dedicated circuit, such as a circuit inside the graphic processing device 304.

The image processing apparatus 300 described above receives a signal of an image taken without an infrared cut filter via, for example, the optical disk 306a or another portable recording medium, or the network 310. Subsequently, by performing the same process as that of the color correcting unit 106 on the received image signal, it is possible to generate a color image with high color reproduction.

Note that the processing functions of the apparatus described in each of the embodiments above may be achieved by a computer. In this case, a program is made available in which processing details of the functions to be provided to each of the above-described apparatuses are described. By executing the program on the computer, the above-described processing functions are achieved on the computer. The program in which processing details are described may be recorded in a computer-readable recording medium. Such computer-readable recording media include a magnetic-storage device, an optical disk, a magneto-optical recording medium, and a semiconductor memory. Examples of the magnetic-storage device are a hard disk drive (HDD), a flexible disk (FD), and a magnetic tape. Example of the optical disk are a DVD, a DVD-RAM, a CD-ROM, a CD-R, and a CD-RW. An example of the magneto-optical recording medium is a magneto-optical disk (MO).

In the case of distributing the program, portable recording media, such as DVDs and CD-ROMs, in which the program is recorded are sold. In addition, the program may be stored in a memory device of a server computer and then transferred from the server computer to another computer via a network.

A computer for executing the program stores the program, which is originally recorded in a portable recording medium or transferred from the server computer, in its own memory device. Subsequently, the computer reads the program from its own memory device and performs processing according to the program. Note that the computer is able to read the program directly from the portable recording medium and perform processing according to the program. In addition, the computer is able to sequentially perform processing according to a received program each time such a program is transferred from the server computer connected via a network.

According to one aspect, it is possible to improve correction accuracy of an image.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. An image processing apparatus comprising:
   a memory; and
   a controller configured to execute processing to
     determine, for each of color components included in an input image signal, which one of a plurality of divided areas in color distribution a value of the input image signal falls within, the divided areas being defined for each of the color components,
     read correction coefficients corresponding to the determined divided area for each of the color components from the memory in which correction coefficients are registered for each of the color components and each of the divided areas, and
     calculate, based on the input image signal, an output value for each of the color components of an output image signal using the correction coefficients for the corresponding color component read from the memory,
   wherein:
   the divided areas are individually separate areas in a chromaticity distribution, and
   in the processing of determining which one of the divided areas the value of the input image signal falls within, the input image signal is converted into a value of a first color system corresponding to the chromaticity distribution, and a divided area in which the value obtained after the conversion is included is determined in a second color system of the input image signal with respect to each of the color components.

2. The image processing apparatus according to claim 1, wherein
   each of a plurality of correction object colors is classified, for each of the color components, into one of a plurality of groups corresponding one-to-one with the divided areas in such a manner that, when a post-correction output value for each of the correction object colors is calculated for each of the color components using a plurality of correction coefficients specific to the color component and the classified group, a difference between the post-correction output value for each of the correction object colors and a value of a target color corresponding to the correction object color with respect to the color component falls within a predetermined range, and
   the divided areas corresponding one-to-one with the groups are defined in such a manner that each of the divided areas includes one or more of the correction object colors classified into the corresponding group.

3. The image processing apparatus according to claim 2, wherein
   the value of the target color is a value of an image signal obtained by taking an image of a predetermined color sample using a solid-state image pickup device in which an infrared cut filter is disposed in an incident optical path, and a value of the correction object color corresponding to the target color is a value of an image signal obtained by taking an image of the predetermined color sample using a solid-state image pickup device in which no infrared cut filter is disposed in an incident optical path.

4. The image processing apparatus according to claim 1, wherein
   the divided areas are areas formed by dividing an a*b* coordinate system with an a* component and a b* component in an L*a*b* color system, and
   in the processing of determining which one of the divided areas the value of the input image signal falls within, the input image signal is converted into a value of the L*a*b* color system, and a divided area in which values of the a* component and the b* component obtained after the conversion are included is determined in the second color system of the input image signal with respect to each of the color components.

5. The image processing apparatus according to claim 4, wherein
   the divided areas are areas formed by dividing the a*b* coordinate system using one or more demarcation lines, each of which is one of a straight line, a curve line, and a circle, and
   in the processing of determining which one of the divided areas the value of the input image signal falls within, the divided area in which the values of the a* component and the b* component obtained after the conversion are included is determined based on the demarcation lines in the a*b* coordinate system, which demarcation lines are set in the second color system of the input image signal with respect to each of the color components.

6. The image processing apparatus according to claim 5, wherein
   each of a plurality of correction object colors is classified, for each of the color components in the second color system of the input image signal, into one of a plurality of groups corresponding one-to-one with the divided areas in such a manner that, when a post-correction output value for each of the correction object colors is calculated for each of the color components using a plurality of correction coefficients specific to the color component and the classified group, a difference between the post-correction output value for each of the correction object colors and a value of a target color corresponding to the correction object color with respect to the color component falls within a predetermined range, and
   the demarcation lines are set, for each of the color components in the second color system of the input image signal in such a manner that, in the a*b* coordinate system, coordinates of correction object colors classified into the same group are included in a single divided area defined by the demarcation lines.

7. The image processing apparatus according to claim 6, wherein
   the value of the target color is a value of an image signal obtained by taking an image of a predetermined color sample using a solid-state image pickup device in which an infrared cut filter is disposed in an incident optical path, and a value of the correction object color corresponding to the target color is a value of an image signal obtained by taking an image of the predetermined color sample using a solid-state image pickup device in which no infrared cut filter is disposed in an incident optical path.

8. The image processing apparatus according to claim 1, wherein
in the processing of calculating the output value for each of the color components of the output image signal using the correction coefficients, the output value for each of the color components of the output image signal is calculated by performing a matrix operation, and the correction coefficients are row components of matrix coefficients.

9. An image pickup apparatus comprising:
a solid-state image pickup device; and
a controller configured to execute processing to
   determine, for each of color components included in an input image signal obtained by the solid-state image pickup device, which one of a plurality of divided areas in color distribution a value of the input image signal falls within, the divided areas being defined for each of the color components,
   read correction coefficients corresponding to the determined divided area for each of the color components from the memory in which correction coefficients are registered for each of the color components and each of the divided areas, and
   calculate, based on the input image signal, an output value for each of the color components of an output image signal using the correction coefficients for the corresponding color component read from the memory,
wherein:
the divided areas are individually separate areas in a chromaticity distribution, and
in the processing of determining which one of the divided areas the value of the input image signal falls within, the input image signal is converted into a value of a first color system corresponding to the chromaticity distribution, and a divided area in which the value obtained after the conversion is included is determined in a second color system of the input image signal with respect to each of the color components.

10. A non-transitory computer-readable storage medium storing a computer program, the computer program causing a computer to perform a procedure comprising:
   determining, for each of color components included in an input image signal, which one of a plurality of divided areas in color distribution a value of the input image signal falls within, the divided areas being defined for each of the color components,
   reading correction coefficients corresponding to the determined divided area for each of the color components from a memory in which correction coefficients are registered for each of the color components and each of the divided areas, and
   calculating, based on the input image signal, an output value for each of the color components of an output image signal using the correction coefficients for the corresponding color component read from the memory,
wherein:
the divided areas are individually separate areas in a chromaticity distribution, and
in the processing of the determining, the input image signal is converted into a value of a first color system corresponding to the chromaticity distribution, and a divided area in which the value obtained after the conversion is included is determined in a second color system of the input image signal with respect to each of the color components.

* * * * *